(12) United States Patent
Henglein et al.

(10) Patent No.: US 7,828,890 B2
(45) Date of Patent: Nov. 9, 2010

(54) EFFECT PIGMENTS HAVING AN ALUMINUM OR AN ALUMINUM ALOY CORE, PROCESS FOR THE PRODUCTION THEREOF AND USE THEREOF

(75) Inventors: Frank Henglein, Nürnberg (DE); Hermann Birner, Sulzbach-Rosenberg (DE); Michael Grüner, Auerbach (DE)

(73) Assignee: Eckart GmbH & Co. KG (DE)

( * ) Notice: Subject to any disclaimer, the term of this patent is extended or adjusted under 35 U.S.C. 154(b) by 0 days.

(21) Appl. No.: 10/580,120

(22) PCT Filed: Nov. 19, 2004

(86) PCT No.: PCT/EP2004/013173

§ 371 (c)(1),
(2), (4) Date: Sep. 11, 2006

(87) PCT Pub. No.: WO2005/049739

PCT Pub. Date: Jun. 2, 2005

(65) Prior Publication Data

US 2007/0104663 A1    May 10, 2007

(30) Foreign Application Priority Data

Nov. 21, 2003   (DE) ................................ 103 54 763

(51) Int. Cl.
  *C09C 1/62*  (2006.01)
  *C04B 14/00*  (2006.01)
  *B05D 7/00*  (2006.01)
(52) U.S. Cl. ...................... 106/404; 106/400; 427/215; 427/216; 427/217; 427/218
(58) Field of Classification Search .................. 106/400, 106/404, 415, 417, 439, 459, 474, 479, 31.9, 106/31.65; 424/61, 70.7, 64; 428/403, 404; 427/215–218
See application file for complete search history.

(56) References Cited

U.S. PATENT DOCUMENTS

| | | | |
|---|---|---|---|
| 5,059,245 A | | 10/1991 | Phillips et al. |
| 5,135,812 A | | 8/1992 | Phillips et al. |
| 5,607,504 A | * | 3/1997 | Schmid et al. .............. 106/403 |
| 5,624,486 A | * | 4/1997 | Schmid et al. .............. 106/404 |
| 5,763,086 A | * | 6/1998 | Schmid et al. .............. 428/404 |
| 5,964,936 A | * | 10/1999 | Reisser ........................ 106/404 |
| 6,648,957 B1 | * | 11/2003 | Andes et al. ................ 106/415 |
| 6,858,072 B1 | * | 2/2005 | Li et al. ....................... 106/415 |
| 2003/0039836 A1 | * | 2/2003 | Pfaff et al. .................. 428/404 |
| 2004/0003758 A1 | * | 1/2004 | Bruckner et al. ............ 106/415 |
| 2004/0166316 A1 | * | 8/2004 | Noguchi ...................... 428/402 |

FOREIGN PATENT DOCUMENTS

| | | |
|---|---|---|
| DE | 26 27 428 | 12/1976 |
| DE | 42 23 384 | 1/1994 |
| DE | 195 20 312 A1 | 12/1998 |
| EP | 33 457 | 8/1981 |
| EP | 0 451 785 B2 | 10/1991 |
| EP | 0 580 022 | 1/1994 |
| EP | 0 668 329 A2 | 8/1995 |
| EP | 0 708 154 A2 | 4/1996 |
| EP | 0 717 088 | 6/1996 |
| EP | 0 848 735 | 6/1998 |
| EP | 1 084 198 | 3/2001 |
| EP | 1 270 684 A | 1/2003 |
| WO | WO 96/38505 A | 12/1996 |
| WO | WO 00/09617 | 2/2000 |

OTHER PUBLICATIONS

International Search Report PCT/EP2004/013173 dated Sep. 8, 2005.
Schmid R., et al., "Luster Pigments with Optically Variable Properties", *4th Nurnberg Congress*, pp. 1-10.
W. Cramer et al., "That certain something—Triangular relationships between chromatic, aluminum and interference pigments", *Farbe & Lack*, 109(10):78 (2003). (In German).
W. Cramer et al., "That certain something—Triangular relationships between chromatic, aluminum and interference pigments", *Farbe & Lack*, 109(10):78 (2003). (English translation of the above).

\* cited by examiner

*Primary Examiner*—Anthony J Green
*Assistant Examiner*—Pegah Parvini
(74) *Attorney, Agent, or Firm*—Ostrolenk Faber LLP

(57) ABSTRACT

The invention relates to effect pigments having an aluminum core or aluminum alloy core and an aluminum oxide-containing or aluminum oxide/hydroxide-containing layer enveloping said aluminum core or aluminum alloy core, obtained by chemical wet-process oxidation of lamellar aluminum pigments or aluminum alloy pigments, the content of metallic aluminum in the aluminum core or aluminum alloy core being not more than 90% by weight, based on the total weight of the pigment, wherein the oxidized aluminum pigments or aluminum alloy pigments exhibit at least one highly refractive metal chalcogenide layer having a refractive index of >1.95, and a mixed layer is formed between the highly refractive metal chalcogenide layer and the enveloping aluminum oxide-containing or aluminum oxide/hydroxide-containing layer. The invention further relates to a process for the production of such effect pigments and to the use thereof.

38 Claims, 7 Drawing Sheets

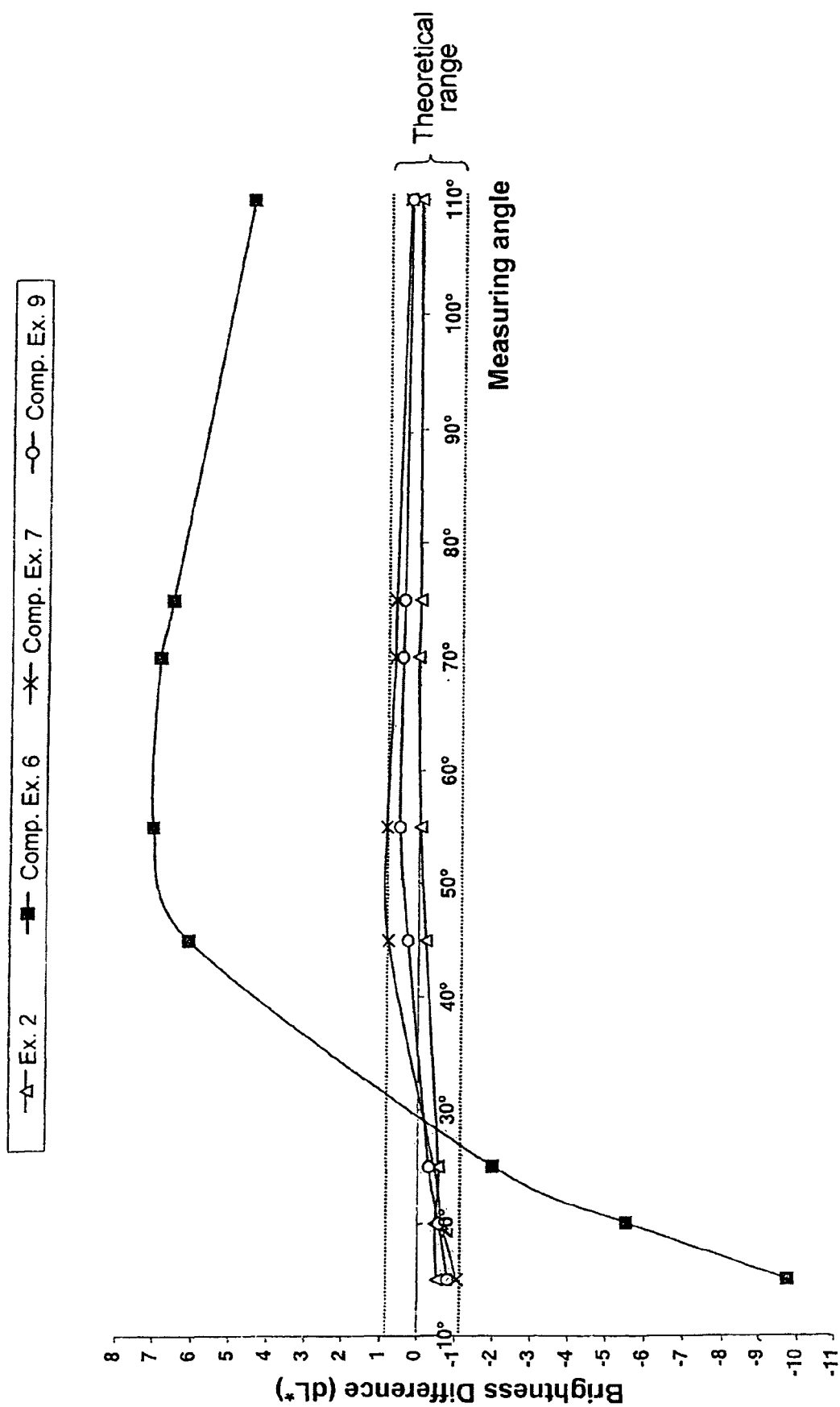

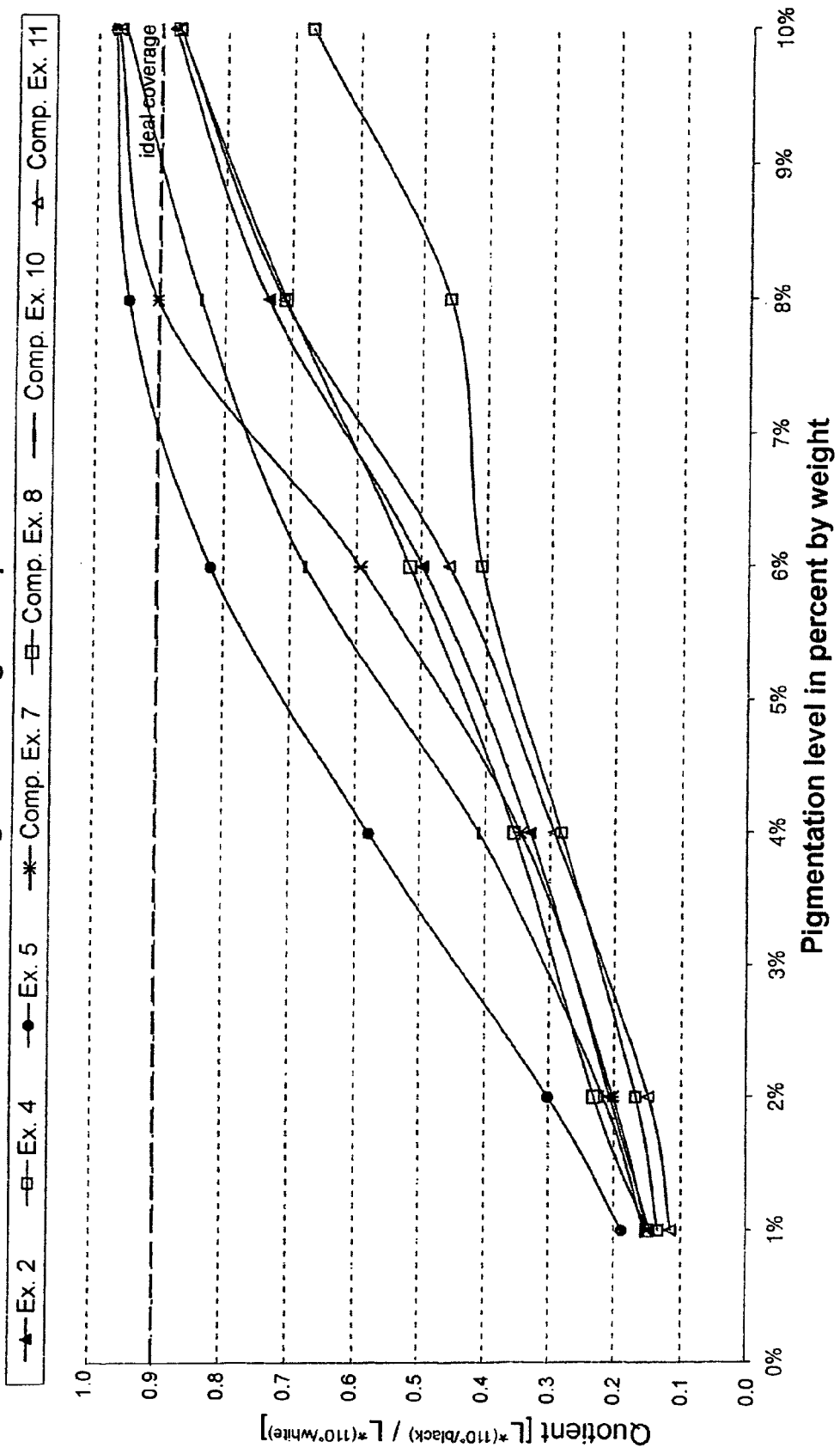
Fig. 4: Coverage Comparison

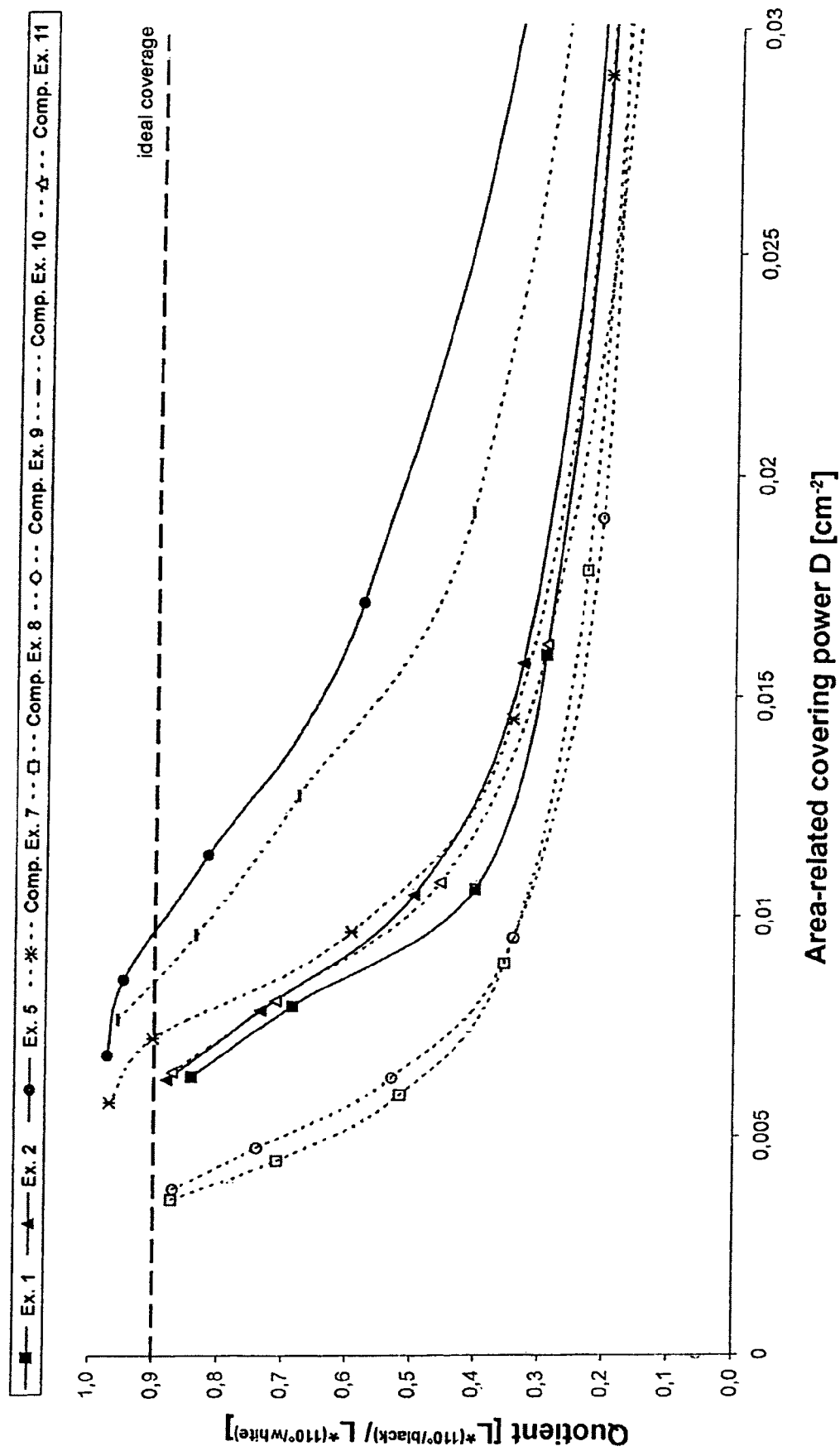

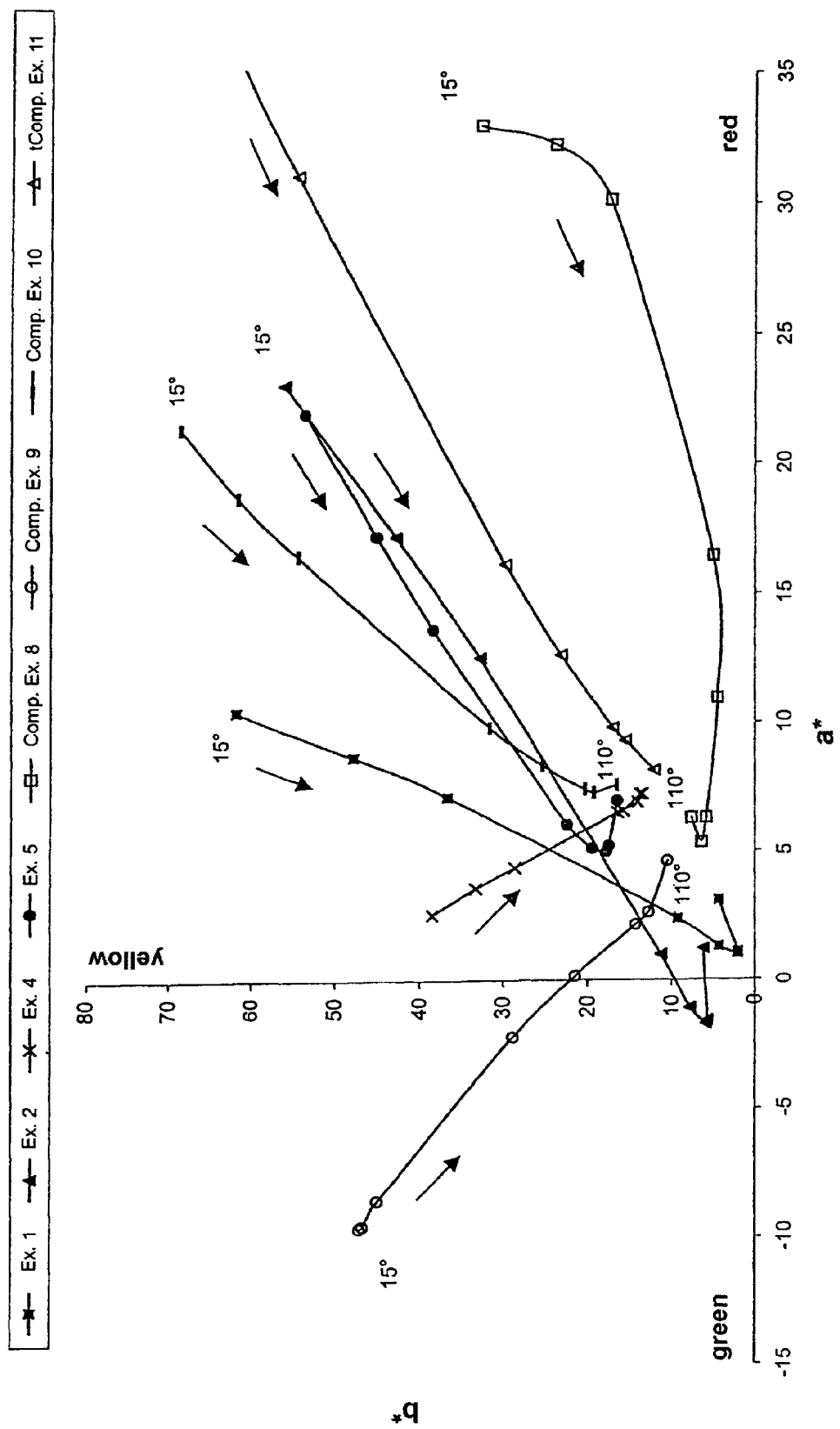

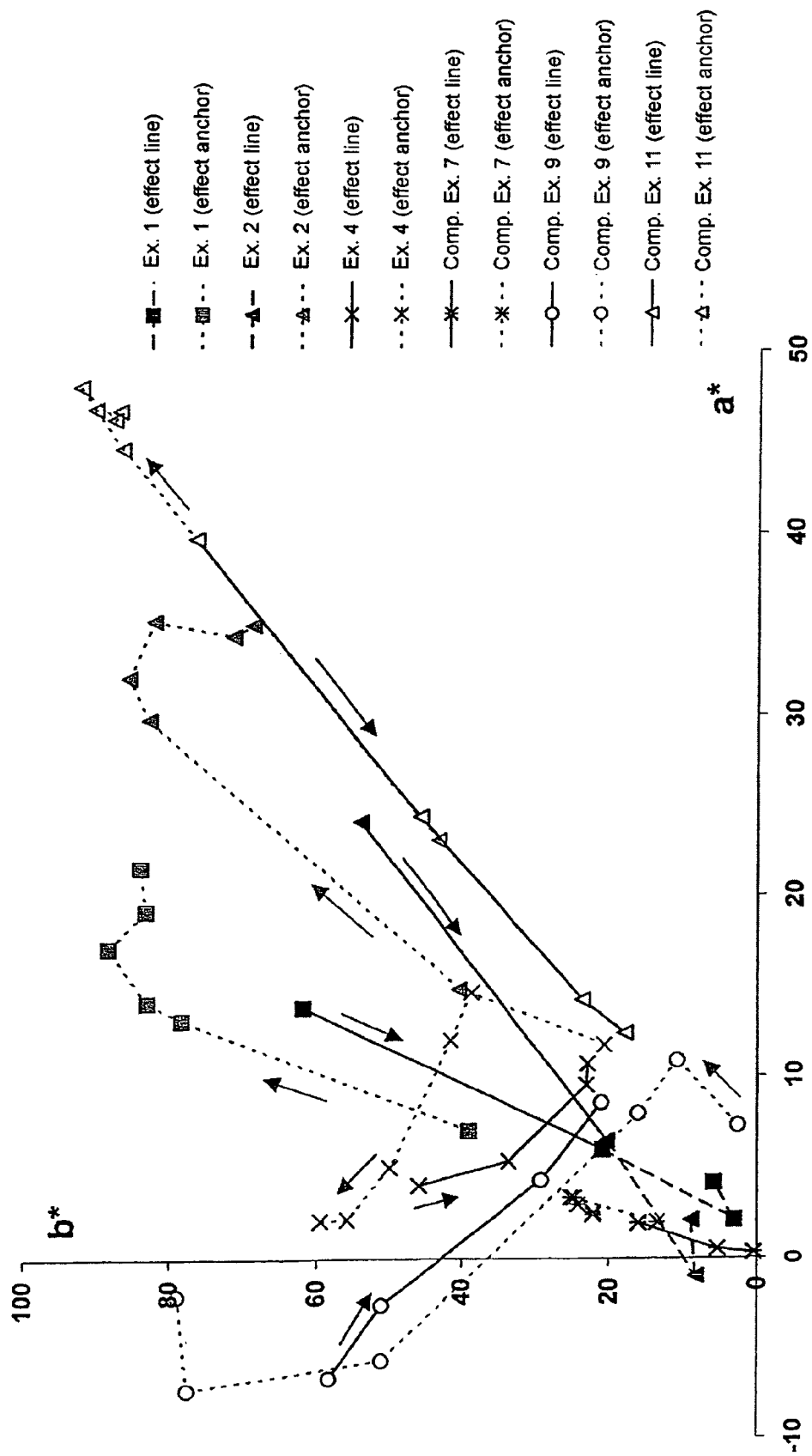

EFFECT PIGMENTS HAVING AN ALUMINUM OR AN ALUMINUM ALOY CORE, PROCESS FOR THE PRODUCTION THEREOF AND USE THEREOF

CROSS REFERENCE TO RELATED APPLICATIONS

The present application is a 35 U.S.C. §371 National Phase conversion of PCT/EP2004/013173 filed Nov. 19, 2004, which claims priority of German Application No. 103 54 763.0 filed Nov. 21, 2003. The PCT application was published in the German language.

FIELD OF THE INVENTION

The present invention relates to effect pigments having an aluminum core or aluminum alloy core and an aluminum oxide-containing or aluminum oxide/hydroxide-containing layer enveloping the aluminum core or aluminum alloy core, obtainable by chemical wet-process oxidation of lamellar aluminum pigments or aluminum alloy pigments, the content of metallic aluminum in the aluminum core or aluminum alloy core being not more than 90% by weight, based on the total weight of the pigment. In addition, the invention relates to a process for the production of these effect pigments and to the use thereof.

BACKGROUND OF THE INVENTION

Effect pigments produce an optical impression which depends on the angle of incidence and/or angle of observation of the applied coating. This is to be attributed on the one hand to the parallel-aligned orientation of the lamellar pigments within the application medium and on the other hand to the specific optical properties of the effect pigment. Thus, in particular, aluminum pigments act, on account of their high degree of reflection of visible light, like an ensemble of small mirrors. This manifests itself in a marked light-dark contrast ("brightness flop") on observation from the specular angle up to more acute observation angles. Pigments of this type can be coated with various layers of variously refractive and/or colored materials. As a result, brilliant colored effect pigments are obtained. The coloring results in this case from a mixture of absorption, interference, and reflection phenomena. In particular, effect pigments having a steep color flop are obtained by utilizing interference phenomena.

Unlike pearl luster pigments, such effect pigments have very good covering power on account of their completely opaque aluminum core.

In addition to the silver-colored aluminum pigments, gold bronze pigments, which are alloys of copper and zinc, can produce golden shades. Further colored metal pigments can be produced by coating the same with colored and/or highly refractive oxides. Thus, iron oxide-coated aluminum pigments, which at the angle of incidence exhibit intensive golden to orange shades, are described in EP 33 457 and are obtainable under the trade name "Paliocrom®" supplied by BASF, Ludwigshafen, Germany. These are aluminum pigments coated only with iron oxide. The coloring here is produced by a mixture of the absorption color of the reddish iron oxide in the hematite modification, interference effects on the iron oxide layer (refractive index about 2.3), and reflection on the aluminum surface. At higher observation angles, however, these pigments only exhibit a color flop to uncolored without significantly changing their color location. In addition, the color range accessible is in practice restricted. The reason for this is the possiblity of the occurrence of the strongly exothermic thermite reaction:

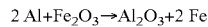

$$2\,Al + Fe_2O_3 \rightarrow Al_2O_3 + 2\,Fe$$

Since the iron oxide layer, as a coating, has the most intimate contact with the underlying aluminum pigment, this very exothermic reaction can be started by supply of a specific activation energy. On account of the finely divided nature of the pigments, "burnout" is associated with considerable safety risks. As a result, the iron oxide layer must in practice be restricted to a layer thickness which corresponds to a substoichiometric amount of iron oxide. In this way, however, strong red shades, for example, will not be accessible. On account of the interference spirals, such color shades would only appear at higher iron oxide layer thicknesses toward the color shades gold, orange and copper. These effect pigments are produced by CVD processes in a fluidized bed reactor. Iron oxide layers are precipitated onto the aluminum pigments fluidized in the fluidized bed by decomposition of iron pentacarbonyl in the presence of oxygen.

Furthermore, effect pigments are also known in which first a coating of a material having a low refractive index is applied and subsequently a partly transparent coating containing a highly refractive material is applied. The latter coating involves metal layers or highly refractive metal oxides or sulfides. In this case, interference pigments having a pronounced color flop, i.e. a change in the color location, are produced. Therefore, it is the desire with this class of interference pigments to produce homogeneous layers which are optically as perfect as possible.

The most spectacular effects with respect to color flops are achieved with effect pigments in which the coatings are vapor-deposited onto a thin metal substrate by means of PVD. Thus, according to the teachings of U.S. Pat. No. 5,059,245 and U.S. Pat. No. 5,135,812, pigments are first provided with a coating of a low-refracting material (n<1.65) and subsequently with a partially transparent metal coating. Optically highly homogeneous and uniform coatings are produced.

These pigments suffer from the drawback that on account of their manner of production they are not completely covered by the outer layers at their sides. If the metal core consists, or the outer layers consist, of aluminum, which is susceptible to corrosion, the use of these pigments in, for example, water-based paints would lead to gassing problems on account of the evolution of hydrogen. The outer metal layers can likewise cause corrosion problems. The extremely high production costs form a further disadvantage and also prevent the use of these pigments in many segments of the market.

EP 0 668 329 A2 describes an effect pigment in which aluminum pigments are first coated under chemical wet-process conditions with silicon oxide or hydrated oxide or with aluminum oxide or hydrated oxide. Subsequently, coating with metal by CVD processes or by currentless chemical wet-process metal deposition is carried out. Alternatively, non-selectively absorbing (colorless) metal oxides are deposited by a CVD processes in a fluidized bed reactor or alternatively under chemical wet-process conditions from organic metal compounds in an organic solvent.

In EP 0 708 154 A2, effect pigments are described having first a coating having a refractive index n<1.8 and subsequently a colored coating in which n>2.0. The highly refractive coating is preferably applied in a fluidized bed reactor by CVD processes, but chemical wet processes onvolving hydrolytic decomposition of organic metal compounds are also described in this reference. Strongly colored effect pigments are obtained, which exhibit an extremely steep color flop. When using iron oxide ($Fe_2O_3$) as the highly refractive layer, pigments in the reddish gold range are accessible.

These effect pigments, however, exhibit a number of disadvantages:

Thus, it is not always advantageous to apply layers which are as uniform and optically homogeneous as possible to the aluminum pigments. In this manner, the formation of intense interference colors and thus of steep color flops is indeed made possible and the color flops extend, in some cases, as far as to the complementary color range. However, steep color flops of this type do not provide real advantages in all applications. For instance, in the very large, stylistically rather conservative market segment of motor vehicle enamels, effect pigments with steep color flop are not desired, since the effect is regarded as being too intense by the customer. In the formulation of a motor vehicle enamel, in this case "flop breakers", such as are described, for example, in EP 0 717 088, must be added in order to reduce the steep color flop effect. Such a solution, however, is uneconomical. Moreover, the designer can and will himself create color flops by suitably combining effect pigments with transparent or well-covering colored pigments. Effect pigments with a shallow color flop are therefore more preferable.

In addition, there is a need for metallic effect pigments with good covering power and colors not accessible hitherto such as red or green or copper colors which are weather-stable and exhibit no significant color flop. For example, there have hitherto been no red metal effect pigments or red metal effect pigment lacquers which do not simultaneously exhibit a blue tinge.

Generally, all CVD processes are more expensive than chemical wet-process coating processes. Chemical wet-process coating with $SiO_2$ or aluminum oxides, however, has disadvantages: In order to attain the desired interference effects, certain layer thicknesses have necessarily to be achieved. In particular with silicon dioxide, on account of its lower refractive index (about 1.5), high layer thicknesses are necessary. As a result of this, however, the total thickness of the effect pigment becomes relatively large. This leads to poor covering power and relatively poor orientation behavior of the pigments and in some cases to spatial hindrance of the stacked pigments in the coating. As a result, losses of luster, luster haze phenomena and losses of the distinctness of image (DOI) occur in the coating.

In the direct chemical wet-process deposition of aluminum oxides or hydroxides on aluminum pigments further disadvantages occur: Layers of this type have only deficient gassing stabilities, since the deposited layers are not dense and are not homogeneous enough. Owing to their method of production, the aluminum pigments are coated with grinding aids such as fatty acids. These act as a sealing layer for the deposition of the aluminum oxide, which leads to layers which are pervious and which, moreover, do not adhere well to the substrate. Admittedly, according to the teaching of DE 42 23 384, the aluminum oxides can be largely freed from the fatty acids adsorbed on the surface in a vapor-phase reaction by reaction with water in an oxygen-containing turbulent atmosphere. However, such a procedure is not economical on account of the high costs.

Exclusive chemical wet-process covering of aluminum pigments with oxide layer packages is described in WO 00/09617. Here, all coatings are carried out in aqueous medium. Different layers are created at different, fixed pHs. First, an amorphous glassy layer ($SiO_2$, phosphate, borate) is applied and subsequently a highly refractive oxide is deposited.

Since the oxide coating is carried out at, in some cases, extreme pHs, the aluminum pigments must be passivated beforehand. Possibilities mentioned in this case are treatment with hydrogen peroxide or nitric acid. This process does not, however, produce well-passivated pigments. Moreover If the treatment is too vigorous, the optical properties (brilliance, brightness) of the pigments are markedly impaired. Thus the problem arises of inadequate gassing stability during the subsequent oxide coating operations and in the final product.

A great disadvantage of all multilayer pigments known in the prior art which are prepared under chemical wet-process conditions or by CVD deposition is the fact that all layers must be deposited on the aluminum pigment as a starting substrate. The aluminum pigment is thus present as a reflector core in its original thickness even in the interference pigment. This thickness, however, due to the method of production, is far greater than that layer thickness which would be necessary for optical impermeability and thus for achieving very good covering power. Therefore, the aluminum cores in the pigments disclosed in the aforementioned specifications are thicker than necessary. This is manifested by a loss of covering power. All further coatings, moreover, increase the total layer thickness of the effect pigment, which leads to decreased luster, luster haze problems in the coating and poor distinctness of image.

In EP 0 848 735, aluminum pigments oxidized under chemical wet-process conditions are described which are oxidized in a mixture of water and an organic solvent. The pigments do not have to be subjected to any degreasing treatment at all prior to oxidation. The pigments exhibit colors ranging from nickel to bright gold to bronze. These colors, however, are only weak and very limited in their color range.

In German Laid-open Specification DE 26 27 428, there is described a process for the production of colored aluminum powder. The deposition of a metal salt and an organic chelating agent from a weakly alkaline solution is disclosed. The aluminum pigments can in this case be subjected in a first treatment stage to passivation with a superficial smooth boehmite film. In addition, the superficial and smooth boehmite film produced according to the teaching of DE 26 27 428 is restricted as to layer thickness and lies far below the thickness range starting from which this layer would be effective as an interference zone for the production of interference colors.

Using the process according to the teaching of DE 26 27 428, colored pigments are obtained which only lie in the gold range. Red or green pigments are not obtainable thereby.

SUMMARY OF THE INVENTION

It is an object of the present invention to provide colored and weather-resistant effect pigments which have a minimal overall thickness, have strongly adhering oxide layers and are entirely safe to use. In addition, the effect pigments desirably possess a soft color flop or an intense color with no substantial color flop. Compared with the known interference pigments, they are required to possess a markedly improved covering power. It is another object of the present invention to develop an inexpensive process for the production of these colored aluminum pigments.

The object underlying the invention is achieved by effect pigments having an aluminum core or an aluminum alloy core and an aluminum oxide-containing or aluminum oxide/hydroxide-containing layer enveloping the aluminum core or aluminum alloy core, obtainable by chemical wet-process oxidation of lamellar aluminum pigments or aluminum alloy pigments, the content of metallic aluminum in the aluminum or aluminum alloy core being not more than 90% by weight, based on the total weight of the pigment, such oxidized aluminum or aluminum alloy pigments containing at least one highly refractive metal chalcogenide layer having a refractive index of >1.95, while a mixed layer is formed between the highly refractive metal chalcogenide layer and the surrounding aluminum oxide-containing or aluminum oxide/hydroxide-containing layer.

Preferred developments are specified in the subordinate claims.

DETAILED DESCRIPTION OF CERTAIN PREFERRED EMBODIMENTS OF THE INVENTION

According to a preferred embodiment, the aluminum pigments employed have a minimum purity of 98% by weight, more preferably of at least 99% by weight and even more preferably at least 99.5% by weight, in each case based on the weight of the starting pigment employed.

When using aluminum alloy pigments as starting pigments, the content of metal different from aluminum is preferably at least 5% by weight, based on the metal content of the starting pigment employed. Preferably, the aluminum alloy contains iron, manganese, copper, vanadium, chromium, nickel, cobalt, silicon, magnesium, zinc, and/or titanium.

The aluminum oxide layer or aluminum oxide/hydroxide layer produced in the effect pigments according to the invention by chemical wet-process oxidation can be a pure aluminum oxide layer or a mixed layer of aluminum oxide and aluminum hydroxide. Below, for the sake of simplicity of style, reference is mostly made to an aluminum oxide/hydroxide layer.

Preferably, the metal chalcogenides are metal oxides, metal sulfides, metal selenides, metal tellurides, or mixtures thereof.

More preferably, the metal chalcogenides are metal oxides.

The explanations below, which are given in relation to aluminum pigments, similarly apply to aluminum alloy pigments.

The oxidized aluminum pigments obtained by chemical wet-process oxidation possess an oxide/hydroxide layer having marked porosity. As a result, during further coating with a more highly refractive metal chalcogenide, preferably metal oxide, a mixed layer, preferably an oxidic mixed layer, can be formed, as the deposited metal chalcogenide, preferably metal oxide, having a refractive index of >1.95 penetrates at least partially into the pores.

By this means, a gradient of the refractive indices preferably results along the perpendicular to the pigment surface. This contributes to a soft, shallow color flop of the effect pigment according to the invention. The aluminum oxide/hydroxide layer produced by chemical wet-process oxidation is furthermore an effective barrier for possible aluminothermic reactions between the aluminum core and the metal chalcogenide layer, preferably metal oxide layer, having a refractive index of >1.95.

The object underlying the invention is furthermore achieved by a process for the production of effect pigments as claimed in any one of claims 1 to 27, which comprises the following steps:

(a) oxidizing aluminum pigments or aluminum alloy pigments, which are suspended in a liquid phase containing an organic solvent, using an oxidant, (b) applying at least one metal chalcogenide layer having a refractive index of >1.95 to the pigments oxidized in step (a), a mixed layer being formed between the metal chalcogenide layer and the aluminum oxide/hydroxide layer.

Preferred developments are specified in the subordinate claims.

The object of the invention is further achieved by the use of the effect pigments produced according to any one of claims 1 to 27 in coatings, lacquers, motor vehicle enamels, powder-based varnishes, printing inks, writing inks, plastics materials, glass, ceramics, or cosmetic preparations.

The effect pigments according to the invention are in particular suitable in cosmetic preparations such as nail varnish, lipstick, make-up, hair-treatment compositions, skin-care preparations, mascara, eyeshadow, eyeliner, rouge, perfume, eau de toilette, powders (in bulk or compressed) or tattooing formulations.

The present invention relates to the provision of effect pigments having a soft color flop and good covering power. They are built up on a lamellar aluminum pigment or an aluminum alloy pigment which has been oxidized under chemical wet-process conditions and has a content of metallic aluminum of not more than 90% by weight, based on the total weight. For the production and intensification of the color, the pigment is coated with at least one further oxide layer having a refractive index of >1.95. Between the highly refractive metal chalcogenide layer, preferably a metal oxide layer, and the aluminum oxide layer there is formed a mixed layer which has a refractive index which lies between the refractive index of the pure aluminum oxide layer or aluminium hydroxide layer and the refractive index of the pure metal chalcogenide layer, preferably a metal oxide layer.

Effect pigments having a core of aluminum are on the market, inter alia, under the trade name "Variocrom®" and are supplied by BASF. Here, first a thick, low-refracting $SiO_2$ layer is deposited on aluminium flakes by means of sol-gel processes, and subsequently an iron oxide layer is deposited from iron pentacarbonyl in a fluidized bed process. The aluminum core serves here as a reflector material and, as a completely opaque material, significantly increases the covering power in comparison with interference pigments such as, for example, pearl luster. The $SiO_2$ layer serves as a low-refracting interference zone. Products found on the market ("Magic Red™" and "Magic Gold™") have $SiO_2$ layer thicknesses of 320 to about 400 nm (R. Schmidt, N. Mronga, V. Radtke and O. Seeger, "Luster Pigments with Optically Variable Properties", 4$^{th}$ Nuremberg Congress, Paper 10, 1998). These layers are applied as homogeneously as possible from the optical point of view in order to enable strong interference effects. This leads to effect pigments having very steep color flops extending as far as the complementary color region. Such strong effects, however, are by no means always desirable and in many applications are regarded as being too "gaudy".

Effect pigments having a soft interference color flop are advantageously built up with layers which are optically not completely homogeneous. Thus it has been found, surprisingly, that aluminum flakes oxidized under chemical wet-process conditions, such as are described in EP 0 848 735, which is included herein by reference, are excellent starting pigments for the provision of effect pigments having a soft color flop after subsequent coating with highly refractive metal chalcogenide layers, preferably metal oxide layers. Furthermore, it has been found that the chemical wet-process oxidation of aluminum flakes can be carried out in a controlled manner such that the aluminum oxide or hydroxide layer thicknesses can be adjusted selectively. The aluminum oxide or aluminum hydroxide layer serves as an interference color zone and is also instrumental in reliably and securely anchoring the metal chalcogenide layers, preferably metal oxide layers. In addition, they can act as a sealing layer and effectively suppress the aluminothermic reaction between the aluminum core or the aluminum alloy core and the highly refractive metal chalcogenide layer, preferably metal oxide layer. As a result, the effect pigments according to the invention are absolutely safe to use.

In chemical wet-process oxidation, the metallic core, i.e. the aluminum core or aluminum alloy core, becomes thinner and the aluminum oxide/hydroxide layer grows in part into the core and in part on the core. As this proceeds, the metallic core becomes severely roughened, which can be demonstrated by electron microscopy on transversely ground sections. This strongly roughened metal surface causes greater scattering of incident light in comparison with smooth metal surfaces. This in turn contributes to a soft color flop of the effect pigments according to the invention.

The aluminum oxide or hydroxide layer produced by chemical wet-process oxidation possesses a porous structure. Pores result, inter alia, due to the hydrogen gas liberated in the chemical wet-process oxidation, which forces its way through the resulting aluminum oxide or hydroxide layer:

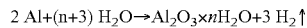

$$2\,Al + (n+3)\,H_2O \rightarrow Al_2O_3 \times nH_2O + 3\,H_2\uparrow$$

The porous structure is manifested, for example, by an increase in the specific surface area in comparison with the untreated aluminum pigment. This can be demonstrated with the aid of BET measurements. Thus, in the case of the aluminum pigments oxidized under chemical wet-process conditions according to the invention the BET specific surface area increases by a factor of at least 2.5, preferably at least 7, more preferably at least 10 and even more preferably at least 15, compared with the untreated pigment.

The layer thicknesses of the aluminum oxide/hydroxide depend on the degree of oxidation of the aluminum and on the layer thicknesses of the aluminum pigment used. They are from 20 to 500 nm, preferably from 30 to 450 nm, more preferably from 50 to 400 nm and even more preferably from 70 to 300 nm.

The porosity of the aluminum oxide layer causes the metal chalcogenide layer having a refractive index of >1.95 first to be deposited at least partially in the pores. A definite mixed oxide layer thereby results. This is combined with a gradient of the refractive index within the layer package along the perpendicular to the pigment surface. At the same time, the refractive index varies between the refractive index of the pure aluminum oxide or hydroxide layer and the refractive index of the pure highly refractive metal chalcogenide layer. All these effects contribute, in the final analysis, to a soft, shallow color flop of the effect pigment according to the invention. Only coating with relatively large amounts of oxide will produce a largely homogeneous oxide layer having a higher refractive index.

The mixed layer built up between the aluminum oxide/hydroxide layer and the applied metal chalcogenide layer, preferably metal oxide layer, preferably has a layer thickness of at least 10 nm, more preferably of at least 20 nm and even more preferably of at least 30 nm.

The highly refractive metal chalcogenide layer, preferably a metal oxide layer, having a refractive index of >1.95 can, on the one hand, be intrinsically colored and comprise materials such as iron oxides, hydrated iron oxide, vanadium oxides, tungsten oxides, chromium oxides and/or molybdenum sulfide. On the other hand, it can consist of successive layers of these materials, of mixed layers of these materials or of successive layers of the pure material and/or mixed layers of these materials.

The chalcogenide layer, preferably metal oxide layer, can have a layer thickness of from 20 nm to 150 nm and preferably from 25 nm 70 nm.

When using iron oxides for the metal oxide layer having a refractive index of >1.95, preferably modifications such as hematite, goethite and/or magnetite or mixtures thereof are used.

Preferably, red iron oxide layers are present mainly in the hematite modification. Effect pigments of this type are coloristically of special interest for the reddish gold range.

The use of chromium(III) hydroxide as a metal oxide produces effect pigments preferentially in the green range.

Depending on the layer thicknesses both of the aluminum oxide/hydroxide layer and of the highly refractive metal chalcogenide layer, preferably a metal oxide layer, effect pigments having very shallow color flops can be obtained. If the layer thickness of the aluminum oxide/hydroxide layer is adapted such that the intrinsic color of the colored metal chalcogenide, preferably metal oxide, is increased, that is, for example, red in the case of iron oxide (hematite) or green in the case of chromium hydroxide, intensely colored effect pigments having substantially no, but preferably no, color flop are accessible.

Quantitatively, in the context of this invention the color flop $\Delta H^*_{anchor}$ is understood as meaning the maximum difference between the individual $H_{*anchor}$ values of the five anchor angles 25°/140°; 45°/150°; 45°/120°; 75°/120° and 75°/90°. The details on this point and the application system are described below.

A weak or shallow or slight color flop is understood in the context of this invention as meaning $\Delta H^*_{anchor}$ values of from 1.5 to 50, preferably from 2.0 to 45, more preferably from 2.5 to 40 and even more preferably from 2.5 to 35. Effect pigments according to the invention with no substantial color flop show $\Delta H^*_{anchor}$ values of from 1.5 to 5, preferably from 2.0 to 4.5 and more preferably from 2.5 to 4.0. Above $\Delta H^*_{anchor}$ values of 50, the effect pigments, when applied to a substrate, are perceived as having a very steep color flop. Below $\Delta H^*_{anchor}$ 1.5, however, virtually no color flop can be perceived by the observer. The color location value H* (Hue) is in this case understood as meaning the value H* customary in the CieLab color measuring system, which is calculated according to the formula $$H^* = \arctan(b^*/a^*)$$

and, considered geometrically, represents the angle of the color location vector to the positive a* axis.

In order to observe a color flop of an application, it must possess a certain degree of color saturation i.e. chroma C*. In the case of uncolored applications, although a color location H* can be measured and determined, the observer does not observe this color at all. Accordingly, a color flop and in particular a weak color flop also cannot be observed. Therefore, the effect pigments according to the invention, in the application system described below and under the measurement conditions indicated, have, at an angle of incidence of 45° and an observation angle of 110° in relation to the surface plane, preferably a chroma C* of at least 15, more preferably at least 20, even more preferably at least 25 and most preferably at least 35.

The effect pigments according to the invention can advantageously have exclusively inorganic coatings and are consequently extremely weather-stable.

In the case of iron oxide layers, there is fundamentally an inherent safety risk when using a coating material of aluminum pigments. If iron oxide is deposited directly onto the finely divided aluminum flakes, there is, after supply of suitable activation energy, a risk of the occurrence of the thermite reaction:

$$2\ Al + Fe_2O_3 \rightarrow Al_2O_3 + 2\ Fe$$

The safety risk of this reaction, which proceeds strongly exothermically, in practice compels one to apply only relatively thin iron oxide layers, in order to keep down the stoichiometric ratios of $Fe_2O_3$ to Al (where in this case, especially, the superficial aluminum is meant). This leads to the fact that the theoretically possible color range, which results from the combination of the intrinsic color of the iron oxide with interference effects of this highly refractive oxide, cannot be utilized to the full. Thus, in the case of the customary market products Paliocrom® (BASF), only the shades gold and orange are obtainable. A copper or red tone, which could be established using greater iron oxide layer thicknesses, cannot be produced for safety reasons.

This is where the pigments according to the invention offer their great advantage to the effect that the aluminum oxide/hydroxide produced by chemical wet-process oxidation acts as a sealing layer between iron oxide and aluminum. The layer thickness of this aluminum oxide/hydroxide layer is preferably at least 20 nm and more preferably from 30 to 40 nm. According to an even more preferred embodiment, the layer thickness lies in the range of from 80 to 300 nm.

In a further embodiment according to the invention, the metal chalcogenide layer, preferably metal oxide layer, having a refractive index of >1.95 possesses no significant intrinsic coloration. In this case, materials such as titanium oxide, zirconium oxide, zinc oxide, tin oxide, and/or cerium oxide are preferably used. Here again, combinations of these materials in successive layers, in mixed layers of these materials, or in successive layers of pure material and/or of mixed layers are possible.

A further embodiment according to the invention finally relates to coatings containing metal chalcogenides, preferably metal oxides, having a refractive index of >1.95, in which colored and noncolored layers alternate. In this manner, up to 4 layer packages can be applied. Thus particularly strong interference colors can be achieved. In the case of more than 4 layer packages, the effect pigment loses covering power on account of the increasingly lower relative aluminium content.

In a further embodiment according to the invention, colorless layers or layers with no substantial intrinsic coloration can alternate with colored layers. For example, the system may comprise layer packages such as $TiO_2/Fe_2O_3$, which are deposited on the aluminum oxidized under chemical wet-process conditions.

A further significant advantage of the chemical wet-process oxidation of aluminum pigments for the production of an aluminum oxide/hydroxide is the fact that—quite unlike any known method of coating—part of the resulting oxide or oxide/hydroxide grows out from the aluminum core, whilst part thereof grows into it.

Consequently, the pigments according to the invention do not involve a coating produced by deposition of aluminum oxide/hydroxide, as is conventionally applied to pigments, but the production of an aluminum oxide/hydroxide layer from within, and on, the aluminum pigment or aluminum alloy pigment.

A number of advantages is associated with this reaction-related unusual feature. On the one hand, an extremely strong composite system is afforded between the aluminum oxide and the aluminum core. This is accompanied by a strong mechanical stability of the finished coated effect pigment, as the metal chalcogenide layer, preferably a metal oxide layer, subsequently applied penetrates into the "fissured" or roughened surface of the aluminum oxide/hydroxide layer and is securely anchored therein.

This anchorage is always stronger than that of external layers deposited on aluminum or aluminum alloy pigments not oxidized according to the present invention, since in these the production-related fatty acids adhering to the aluminum surface always represent a natural hydrophobic sealing layer, which prevents firm anchorage to the aluminum core. In addition, in the case of substantially smooth aluminum surfaces, the subsequently deposited coatings are much less firmly anchored than is the case on the fissured or roughened surface in the aluminum or aluminum alloy pigments prepared according to the invention.

A further advantage resides in the reduction of the thickness of the aluminum core by the ingrowing aluminum oxide or hydroxide. By this means, particularly the relative covering power of the effect pigment is substantially increased. To achieve good coverage, it is, for example, sufficient if the reflector core of aluminum or aluminum alloy in the colored effect pigment is on average not more than 70 nm and preferably from 70 to 40 nm, thick, since it is still virtually opaque at such thicknesses. Thus the aluminum core of the effect pigments according to the invention in general possesses a mean thickness of from 10 to 250 nm, preferably from 15 to 200 nm, more preferably from 20 to 150 nm, very preferably from 30 to 100 nm and most preferably from 40 to 80 nm. Control of the degree of oxidation and the choice of aluminum pigments or aluminum alloy pigments of specific thickness, make it possible to selectively influence the properties of the effect pigment.

In the case of layers exclusively deposited under chemical wet-process conditions, however, the original thickness of the aluminum pigment fully contributes to the thickness of the final product. In this case, much "aluminum content" and thus covering power is wasted.

A critical point, particularly in multilayered effect pigments, is the total layer thickness of the pigment. The diminished thickness of the aluminum core or aluminum alloy core in the effect pigments according to the invention likewise reduces their total layer thickness. From this, a better orientation and thus stacking of the pigments in the application medium, such as, for example, a lacquer, results. For instance, increased luster, decreased gray haze and better distinctness of image (DOI) are the result.

The overall layer thickness of the effect pigments according to the invention is preferably less than 900 nm, more preferably less than 800 nm, even more preferably less than 700 nm and most preferably less than 600 nm. The overall layer thickness can be, for example, 300 nm or 400 nm.

The form factor, i.e. the quotient of the length of the pigments and their thickness, is, for the effect pigments according to the invention, preferably more than 20, more preferably more than 25, even more preferably more than 30 and most preferably more than 40. The length of the pigments is represented here by the $d_{50}$-value of the cumulative breakthrough curve of the volume distribution of laser scattering size determinations. Size characterizations of lamellar effect pigments are common prior art and can be carried out, for example, using Cilas apparatuses supplied by Quantachrome.

According to a preferred embodiment, an iron oxide layer is applied to the aluminum oxide/hydroxide layer produced by chemical wet-process oxidation of the aluminum pigment or aluminum alloy pigment.

In a further development according to the invention, the aluminum pigment oxidized under chemical wet-process conditions is first provided with a low-refracting oxide before coating with a higher refracting metal chalcogenide, preferably metal oxide, having a refractive index of >1.95. The refractive index is preferably of <1.8. This measure can increase, for example, the gassing stability of the effect pigment. This could be advantageous under certain circumstances in aggressive media such as water-based paints on account of the high porosity of the aluminum oxide/hydroxide layer.

Suitable materials for use in a coating of this type, are preferably $SiO_2$, boron oxide, aluminum oxide precipitated under chemical wet-process conditions or mixtures thereof. This oxide layer having a refractive index of <1.8, however, preferably does not completely fill the pores present in the aluminum oxide/hydroxide layer produced by chemical wet-process oxidation. Preferably, this optional, additional oxide layer is applied in amounts of from 1 to 15% by weight, more preferably from 2 to 10% by weight and most preferably from 3 to 7% by weight, in each case based on the weight of the total effect pigment. Below 1% by weight, coating with an oxide having a refractive index of <1.8 is ineffective, for example with respect to gassing stabilization. Above 15% by weight,—after filling the aluminum oxide pores or aluminium hydroxide pores—a dense homogeneous, new oxide layer is applied. Depending on the amount of low-refracting oxide applied, preferably $SiO_2$, boron oxide and/or aluminum oxide precipitated under chemical wet-process conditions, the mixed layer can also consist substantially or completely of low-refracting oxide and of the aluminum oxide/hydroxide layer produced by chemical wet-process oxidation.

Preferably, the aluminum oxide-containing layer or the aluminum oxide/hydroxide-containing layer, the oxide layer of a material having a refractive index of <1.8 and the highly refractive metal chalcogenide layer, preferably metal oxide layer, having a refractive index of >1.95 together form a common mixed layer.

Preferably, the thickness of this common mixed layer is at least 10 nm. More preferably, the thickness of the mixed layer is at least 20 nm and even more preferably at least 30 nm.

In a further embodiment, metal chalcogenide particles having a refractive index of >1.95 are added during the coating process involving an oxide having a refractive index of <1.8. The metal chalcogenide particles in this case preferably have a mean size which allows them to accumulate in the porous aluminum oxide/hydroxide layer to a large extent. A mean size of these metal chalcogenide particles of below 40 nm and preferably below 30 nm, is preferred. The metal chalcogenide particles are preferably nanoscalar metal oxide particles and more preferably nanoscalar iron oxide particles. Here again, a mixed layer of the aluminum oxide/hydroxide is formed, the oxide having a refractive index of <1.8 and the metal chalcogenide having a refractive index of >1.95.

Onto the metal chalcogenide layer or metal oxide layer, having a refractive index of >1.95, there can be precipitated, in a further embodiment according to the invention, a further layer having a refractive index of <1.8. As a further protective layer, this layer can additionally impart gassing stability to the colored effect pigment and thus improve its use in, for example, water-based paints. These additionally coated effect pigments can furthermore optionally be provided with reactive orienting agents, such as are described, for example, in EP 1 084 198, which is herein included by reference. By this means, better binding to the paint system is made possible, which produces, for example, better condensate resistance.

The further layer having a refractive index of <1.8 preferably consists of silicone dioxide, aluminum oxide and/or hydroxide, boron oxide, or mixtures thereof.

According to a preferred development of the invention, first a silicon oxide layer and subsequently an iron oxide layer is applied to an aluminum pigment or aluminum alloy pigment oxidized under chemical wet-process conditions.

The process for the production of the pigments according to the invention is divided into two steps. First, the aluminum pigments are oxidized according to the process disclosed according to the teaching of EP 0 848 735, which is included herein by reference.

First of all, aluminum pigments are suspended preferably in an organic solvent and heated to the reaction temperature, and the oxidation reaction is started by the addition of an oxidant, preferably water, and optionally a catalyst. By varying the reaction time, the reaction temperature and the amount of oxidant, such as, for example, water, and catalyst, the degree of oxidation and thus the oxide layer thickness of the oxidized aluminum pigments can be selectively adjusted.

Preferably, the oxidation of the aluminum pigments or aluminum alloy pigments is carried out at pH 7 to pH 12 in a mixture of water and one or more water-miscible organic solvents. Preferably, the water content of the mixture is from 3 to 60% by weight and more preferably from 15 to 55% by weight, in each case based on the weight of the mixture.

The amount of water, based on aluminum or aluminum alloy, is preferably from 10 to 120% by weight and more preferably from 15 to 55% by weight. If the value lies below 10% by weight, oxidation is only weak. If the value lies above 120% by weight, agglomerated pigments can result.

The oxidation of the aluminum pigments or aluminum alloy pigments is customarily carried out at a temperature lying between room temperature and the boiling point of the solvent.

The precipitation of metal chalcogenide, preferably metal oxide, having a refractive index of >1.95 can preferably be carried out by dissolving a metal salt in a predominantly organic medium and preferably metering it at a constant pH and preferably constant temperature into a dispersion or suspension of the oxidized aluminum pigments in predominantly organic medium.

According to a further preferred development of the invention, an oxide layer having a refractive index of <1.8 is applied prior to the application of a highly refractive metal chalcogenide layer, preferably metal oxide layer, having a refractive index of >1.95.

Possible metal salts are the halides, in particular the chlorides, and also nitrates or acetates, of the corresponding metals, provided that they are soluble in the predominantly organic medium used. The use of complexed salts is also possible. Examples of complex ligands which may be used are acetylacetonates such as $Ti(acac)_4$.

The pH depends on the metal chalcogenide, preferably metal oxide, to be precipitated and can be determined by a person skilled in the art without difficulty. In the case of successive layers of different metal chalcogenides, preferably metal oxides, the pH can optionally be adjusted to the desired value by the addition of suitable acids or bases prior to the respective precipitation. Suitable acids may be considered to be, in particular, mineral acids such as HCl or $H_2SO_4$. The base used may be, for example, a sodium hydroxide solution.

The predominantly organic medium used preferably consists of alcohols having 1 to 5 C atoms, and mixtures thereof and mixtures with water.

Preferably, the organic solvent is selected from the group consisting of alcohols, glycols and ketones, preferably ethanol, n-propanol, isopropanol, n-butanol, isobutanol, tert-butanol, methoxypropanol, acetone, butyl glycol, and mixtures thereof.

A predominantly organic medium is understood as meaning a solvent mixture having a content of organic solvent of preferably altogether more than 80% by weight. The remainder of the solvent mixture consists substantially of water, which is needed as a reaction partner for the hydrolysis of the metal salts to the corresponding metal hydroxides and/or oxides.

A particular advantage of this predominantly organic solvent is the fact that the oxidized aluminum pigments are not attacked even at such extreme pHs of <3 and >8 in comparison with a purely aqueous medium.

The object underlying the invention is further achieved by the provision of a coating composition which contains effect pigments according to the invention.

Preferably, the coating composition is selected from the group consisting of coatings, lacquers, motor vehicle enamels, printing inks, writing inks, plastics materials, glass, ceramics, or cosmetic preparations. According to a preferred development, the cosmetic preparation is a nail varnish.

The coating composition according to the invention can in addition contain the additives customary for the respective use, such as, for example, one or more film-forming agents, one or more solvents, etc.

The invention will now be illustrated with reference to the following examples and attached figures, without restricting the scope of protection of the claims.

BRIEF DESCRIPTION OF THE FIGURES

FIG. 3 shows brightness difference of applications of examples according to the invention and comparative examples after subjection to shear forces (Waring Blendor Test).

FIG. 4 shows the calorimetrically determined covering power (quotient of the brightness dark/light at a 110° measuring angle) of doctor knife coatings in examples according to the invention and comparative examples as a function of the pigmentation level in percent by weight.

FIG. 5 shows the calorimetrically determined covering power (quotient of the brightness dark/light at a 110° measuring angle) of doctor knife coatings in examples according to the invention and comparative examples of FIG. 4 as a function of the surface-based covering power D.

FIG. 6 shows the calorimetrically determined a*b* values of the CieLab system (effect lines) of examples according to the invention and comparative examples at seven different observation angles (15°, 20°, 25°, 45°, 70°, 75°, 110°) at a constant incidence angle of 45°, which were obtained using a goniospectrophotometer supplied by Optronic Multiflash, Berlin, Germany.

FIG. 7 additionally shows a plot of the a* against the b* color values at three different angles of incidence and in each case two observation angles (+/−15° relative to the specular angle). These values designated as "effect anchors" (25°/170°; 25°/140°; 45°/150°; 45°/120°; 75°/120°; 75°/90°) (angle of incidence/observation angle) are likewise based on the surface plane and measured using the measuring apparatus: goniospectrophotometer Multi FX10 supplied by Datacolor.

EXAMPLES

Figure 1:
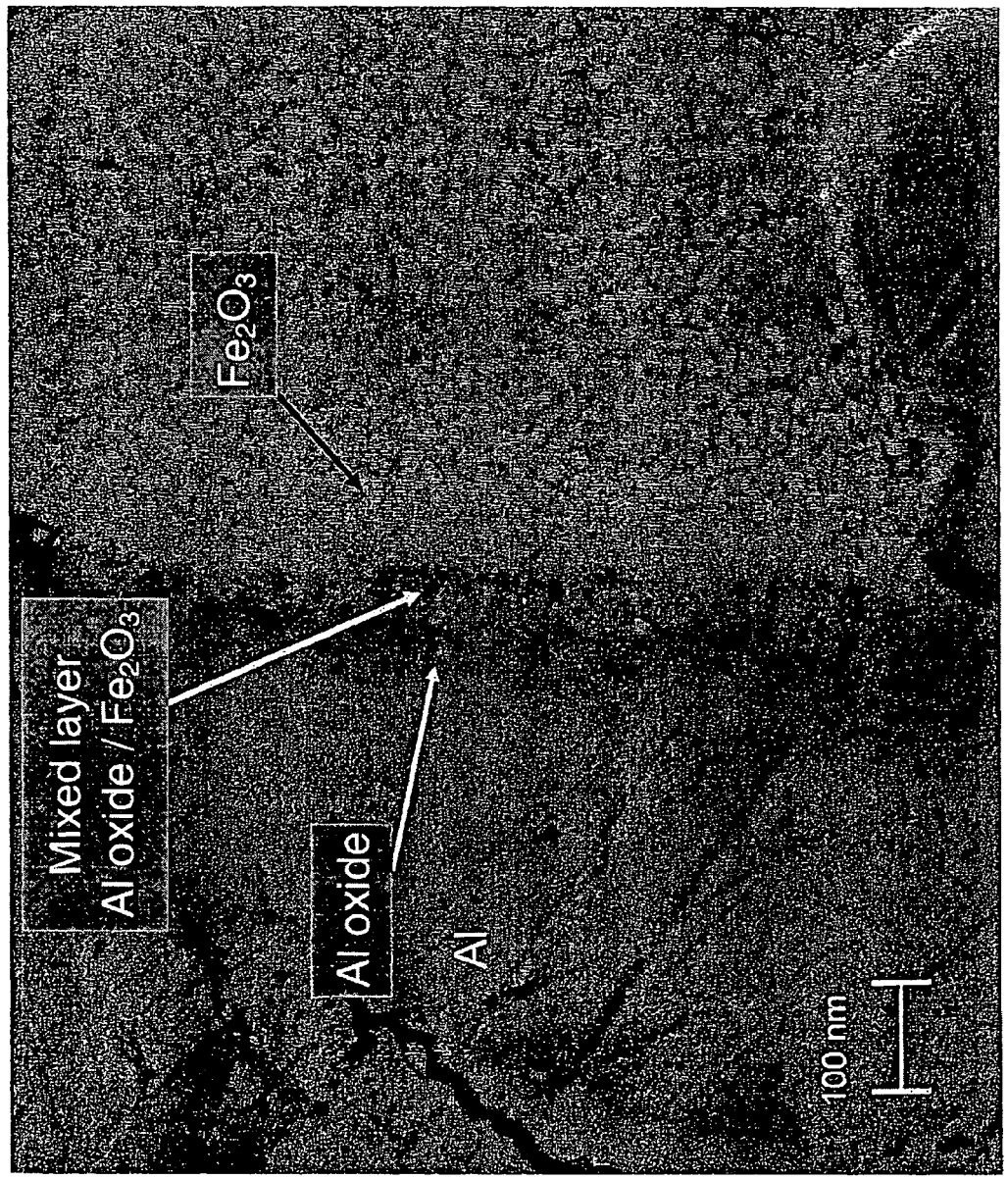
FIG. 1 shows an SEM image of a transversely ground section of a pigment produced according to Example 3 according to the invention. The mixed layer of iron oxide (light) and aluminum oxide/hydroxide (dark) can be discerned.

The following Examples are provided only for the purpose of illustrating the invention. They are not to be construed as limiting the invention in any manner.

Examples 1-5 and 12-14 According to the Invention

Oxidation: The production of the aluminum oxide/hydroxide layer was carried out according to the process disclosed in EP 0 848 735.

In a plane-ground reaction vessel of sufficient size, 100 g of aluminum pigment were introduced in the form of a paste with 240 g of isopropanol and dispersed for 10 min. Subsequently, a mixture of demineralized water and base (for amounts see Table1) was added to the vessel. The suspension was heated to just below the boiling point. After a heating time of 7 h, the suspension was allowed to cool. 16 h later, the mixture was filtered off with suction through a Büchner funnel and the filter cake was dried in a vacuum drying oven at 100° C. for 6 h with $N_2$ flushing.

Iron Oxide Coating:

The oxidized aluminum pigment was added with technical ethanol to a 3 liter plane-ground reaction vessel and dispersed. The amounts used are indicated in Table 1. In order to ascertain the appropriate amounts in the case of larger batches, a number of individual batches of the oxidized aluminum pigment were mixed with one another. The suspension was subsequently heated to 60° C. and adjusted to a pH of 6.2 using aqueous HCl (concentration of HCl=18% by weight). The continuous addition of an alcoholic $FeCl_3$ solution (concentration of ($FeCl_3 \times 6H_2O$)=40% by weight) was then commenced (for amounts see Table 1). By adding alcoholic sodium hydroxide solution, the pH was kept constant at 6.2. On completion of the addition, the suspension was filtered off with suction in the hot state through a Büchner funnel and the filter cake was washed a number of times with an alcohol/water mixture. The filter cake was dried at 100° C. for 6 h in a vacuum drying oven with $N_2$ flushing.

Comparative Example 6

Aluminum Oxide Precipitated Under Chemical Wet-Process Conditions 45 g of Al triisopropylate and 250 g of isopropanol were placed in a 1 liter reactor, dispersed and dissolved with stirring at an 83° C. forerun temperature. 160 g of commercially available Mex 2154 (Eckart, Fürth, Germany) were added and rinsed with a solution of organic base and isopropanol. After a dispersion time of 1 h, a mixture of 5.5% of organic base and 94.5% of demineralised water was added dropwise in a stoichiometric ratio. After a 7-hour heating time, the suspension was stirred for 16 h, then filtered on a suction filter, and the filter cake was dried at 100° C. in a vacuum drying oven.

Comparative Example 7

The oxidized aluminum pigment of Example 1 without subsequent coating with iron oxide.

Comparative Examples 8+9:

The marketed products Variocrom® M-red and Variocrom® M-gold (BASF, Ludwigshafen, Germany)

Comparative Examples 10+11

The marketed products Paliocrom® L2000 and Paliocrom® LP2800 (BASF, Ludwigshafen, Germany)

Analytical data and specular angles of doctor knife coatings of the examples and comparative examples are indicated in Table 2.

Comparative Example 15

Aluminum powder E900 (Eckart, Fürth, Germany): A very fine aluminum powder obtainable commercially.

is very well resolved. The aluminum oxide/hydroxide phase is to be discerned as a dark contrast to the pure aluminum phase, whereas iron oxide produces a bright contrast. The iron oxide layer possesses a pronounced particulate structure. On the phase boundary between iron oxide and aluminum oxide a mixed layer is distinctly discernible. Small iron oxide particles have discernibly accumulated in the porous aluminum oxide layer.

Figure 2:
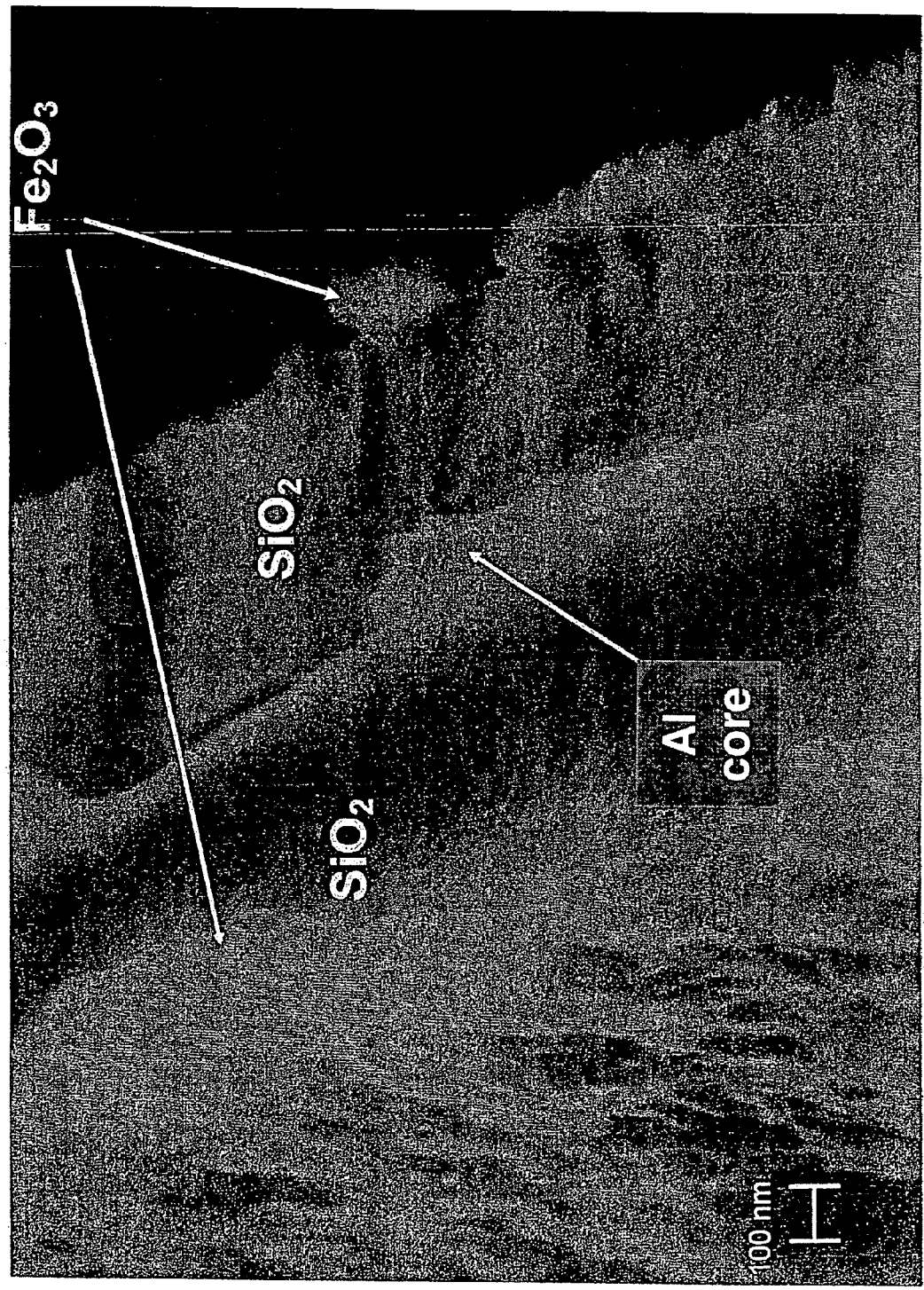
FIG. 2 shows an SEM image of a transversely ground section of a pigment according to Comparative Example 8. Here, no mixed layer of iron oxide (light) and silicon dioxide can be discerned (dark), but a sharp boundary between iron oxide and silicon dioxide.

In FIG. 2, a similar image of a pigment according to Comparative Example 8 is shown. Here, layers which are in every respect very homogeneous, uniform and separate from one another are discerned. A mixed layer of iron oxide and the $SiO_2$ layer cannot be discerned.

TABLE 1

Reaction parameters for the production of Examples 1-5 and 12-14 according to the invention.

| | | Production of the aluminum oxide layer according to EP 0 848 735 | | | | Production of $Fe_2O_3$ layer | | |
|---|---|---|---|---|---|---|---|---|
| Examples | Starting material | Water [g] | Base | Amount of base [g] | Amount of oxidized aluminum [g] | Amount of solvent (ethanol) [g] | Volume of added $FeCl_3$ soln [ml] | |
| 1 | MEX 2154 (Eckart) | 40 | Butylamine | 3.0 | 100 | 900 | 250 | |
| 2 | MEX 2154 (Eckart) | 40 | EDA | 2.3 | 100 | 900 | 312.5 | |
| 3 | MEX 2154 (Eckart) | 100 | Butylamine | 4.5 | 100 | 1,250 | 587 | |
| 4 | MEX 2154 (Eckart) | 100 | Butylamine | 4.0 | 100 | 900 | 240 | |
| 5 | VP 57900 (Eckart) | 60 | EDA | 2.5 | 45 | 855 | 250 | |
| 12 | MEX 2154 (Eckart) | 40 | Butylamine | 3.0 | 200 | 1,000 | 350 | |
| 13 | MEX 2154 (Eckart) | 100 | Butylamine | 4.5 | 167 | 835 | 353 | |
| 14 | MEX 2154 (Eckart) | 40 | Butylamine | 3.0 | 600 | 1,500 | 600 | |

In FIG. 1, an SEM image of a transversely ground section of the pigments according to the invention is shown (from Example 3). The pigment has been measured under an extremely obtuse angle. By this means, the boundary surface

TABLE 2

| Product | Cilas $D_{50}$ [μm] | BET [m²/g] | act. Al content [%] | Fe content [%] | Si Content [%] | Density [g/cm³] | Luster* [60°] |
|---|---|---|---|---|---|---|---|
| Example 1 of the invention | 22.0 | 55.8 | 48.3 | 12.1 | / | 2.9 | 23.3 |
| Example 2 of the invention | 19.7 | 56.7 | 45.5 | | / | 3.2 | 19.3 |
| Example 4 of the invention | 26.2 | 67.1 | 33.3 | 18.7 | / | 3.4 | 18.3 |
| Example 5 of the invention | 20.2 | 42.0 | 20.0 | 43.0 | / | 3.4 | 16.3 |
| Comparative Example 6 (Al oxide precipitated) | 21.5 | 86.7 | 69.3 | <0.5 | / | 3.2 | 29.8 |
| Comparative Example 7 (Aloxal ® 3010) | 23.2 | 79.6 | 63.2 | <0.5 | / | 2.5 | 26.7 |
| Comparative Example 8 (Variocrom ® M-red) | 14.6 | 1.0 | 32.8[1] | 9.8 | 27.2 | 2.5 | 11.2 |
| Comparative Example 9 (Variocrom ® M-gold) | 16.5 | 1.1 | 29.4[1] | 6.3 | 28.8 | 2.3 | 12.9 |
| Comparative Example 10 (Paliocrom ® L 2000) | 25.6 | 3.1 | 67.6 | 15.2 | / | 3.0 | 17.7 |
| Comparative Example 11 (Paliocrom ® L 2800) | 20.9 | 1.8 | 59.4 | 19.0 | / | 3.1 | 16.2 |

*at 10% pigment level, well covering
[1] calculated values for the stoichiometries $SiO_2$ and $Fe_2O_3$ Data on the more detailed characterization of the effect pigments are listed in Table 2. They include pigment characteristics such as the median of the size distribution, the specific surface area, the density, and the analytical composition as per elemental analysis. For ascertaining the specific surface area according to BET, the dried pigment was in each case heated for 2 h at 300° C. and then passed on to the determination stage, which was carried out using liquid nitrogen. The measuring apparatus used was the type Gemini supplied by Micromeritics; D-41238 Moenchengladbach, Germany. Likewise, the luster values which were measured from doctor knife coatings (see below) are listed. It is seen, above all, that the Variocrom® pigments, which have a small particle size distribution and, on account of their high $SiO_2$ content, a very high density, clearly have the poorest luster properties. Examples 1-5 according to the invention, compared with Comparative Example 7 (oxidized aluminum pigment with no $Fe_2O_3$ coating) or Comparative Example 6 show decreased luster on account of the additional iron oxide layer. However, their luster is higher than that of the Paliocrom® products only coated with iron oxide and markedly higher than that of the Variocrom® products. With some of the examples, various tests were carried out which are described below.

Waring Blendor Test:

In industry, many lacquers are processed in recycling systems. In such cases, the lacquer components are exposed to high shear forces. The Waring blendor Test now simulates these conditions and serves to determine the annular pipeline stability or the shear stability. Precisely those pigments whose coating is not anchored sufficiently to the carrier material show strong differences in the brightness values in this test relative to the untreated applications. The Waring Blendor test can thus be taken as a measure of the mutual adhesion of the individual coatings as a function of shear forces.

Procedure:

The pigment paste was weighed and mixed stepwise in an 880 ml beaker with a conventional wet lacquer based on hydroxy-functional acrylates to form a paste therewith. Afterwards, the viscosity was adjusted to 17" in a DIN 4 mm beaker using a 1:1 mixture of butyl acetate and xylene. A total of 600 g of lacquer was prepared, of which 400 g were filled into a double-walled 1 kg vessel with water cooling and stirred in a Dispermat (Waring Blendor) equipped with a special attachment. The stirring time was 8 minutes at 13,500 rpm, after which 200 g of lacquer were removed and the remainder was stirred for a further 12 minutes.

Batch: 6% powder (pigment)
  8% butyl acetate 85
  86% CSR lacquer, colorless
  30% dilution with butyl acetate 85/xylene 1:1

200 g of each of the untreated and treated lacquer were then applied with an automatic sprayer and a spraygun LP-90 (both supplied by Languth, Germany) at the following settings:

Settings: needle: 1.3.4
  pressure: 4 bar

Operations: The number of spraying operations was chosen such that a dry lacquer layer thickness of 15-20 µm was produced.

Conventionally, effect pigments are regarded as being shear-stable if in the application according to the Waring Blendor test the brightness difference $\Delta E^*$ relative to the untreated sample is smaller than 1. This should be applicable to all measurement angles.

In FIG. 3, the brightness differences of the metallic test sheet which were used in some of the examples and to which the prepared lacquer samples had been applied are plotted against the individual measurement angles after a treatment of 20 minutes.

The test sheet of Comparative Example 6, on which aluminum oxide had been deposited under chemical wet-process conditions, exhibited very high brightness differences. The pigment was in this case strongly damaged. By contrast, the test sheets of Comparative Example 7 (oxidized pigment with no iron oxide, Aloxal® 3010) and Comparative Example 9 and Example 2 according to the invention fulfilled the criteria of the test. Variocrom® Magic Red (BASF) also passed the test. The chemical wet-process oxidation of the aluminum had discernibly led to outstanding adhesion of the oxide to the aluminum core, which was still retained after subsequent coating with iron oxide. An aluminum oxide layer which had only been precipitated under chemical wet-process conditions, however, did not exhibit good adhesion (see Comparative Example 6). Also, it was to be observed during the preparation of Comparative Example 6 that the iron oxide layer adhered poorly and many secondary precipitations were produced.

Coverage Comparison:

The respective pigment was stirred at various pigmentation levels (percent by weight of pigment, based on the total weight of the wet lacquer) in the range of from 1 to 10% into 10 g of a conventional nitrocellulose lacquer (Dr. Renger Erco bronze mixed lacquer 2615e; Morton). In this case, the effect pigment was introduced and subsequently dispersed in the lacquer using a brush.

The ready-to-use lacquer was applied to test cards No. 2853 supplied by Byk Gardner (contrast paper) in a doctor knife applicator so as to have a wet film thickness of 50 µm.

At all pigmentation levels, the lacquer applications on a black and white background were measured using a goniospectrophotometer supplied by Optronic Multiflash, Berlin, Germany at a measurement angle of 110° relative to the specular angle.

The quotient of the brightness values of black relative to a white background was plotted against the pigmentation level in percent by weight (FIG. 4). As a coverage criterion, a value of greater than 0.98 is customary in the literature for aluminum pigments, as mentioned, for example, in EP 0 451 785. Aluminum pigments exhibit outstanding covering power, on account of their complete opacity to visible light and their plane-parallel orientation in the lacquer.

The multicoated effect pigments according to the invention, which, like similar effect pigments known in the prior art, also had an at least five-layered configuration, naturally exhibited poorer coverage in comparison with pure aluminum pigments on account of their relatively low aluminum content. Therefore, for this type of effect pigments good coverage can be assumed even at a quotient of 0.9.

It can be inferred from FIG. 4 that the best specific covering power was achieved by the pigment of Example 5 according to the invention and the Comparative Examples 7 and 10, which as three-layered pigments exhibit only one coating. In Example 5 according to the invention, the starting material used was an extremely thin aluminum pigment (thickness only about 110 nm). For this reason, the covering power of the coated pigment is likewise outstanding in spite of an extremely low aluminum content (only 20% by weight).

The specific covering power of the 5-layered effect pigment Variocrom® Magic Red (Comparative Example 8) is comparable to that of the pigments according to the invention in spite of their very low metal content and very thick SiO$_2$ layers. The reason for this resides in the smaller particle size of these pigments. It is known of metal pigments that they can cover better with decreasing particle size on account of the high proportion of scattering at the edges. An immediate consequence of the smaller particle size, however, is that the luster characteristics of these pigments are poorer, as can be inferred from Table 3. In order to largely eliminate the effect of the different particle size, an area-related covering power D can be defined as follows:

$$D = \frac{\text{density} \times \text{median value}}{\text{initial weight}} = \frac{\frac{m}{V} \times d_{50}}{m} = \frac{d_{50}}{V}$$

In FIG. 5, the quotient of the $L^*_{110°}$ values is plotted against the variable D for the various initial weights. The poorer covering power of the Variocrom® pigments can now be clearly discerned.

The curves can be extrapolated to the quotient 0.9. Using this value in the above formula, the necessary initial weights of pigments area can be calculated for achieving adequate covering power in each case. These values and the specific covering power are listed in Table 3. Moreover, for comparison, luster values measured at a pigmentation level of 10% are listed.

ments according to the invention, the effect pigment of Example 4, considered relatively, had the steepest color flop.

The Variocrom® products (Comparative Examples 8 and 9), however, exhibit steep color flops. The specific covering power is comparable to Examples 1 and 2 according to the invention, but the area-related covering power is lower. In particular, the luster of doctor knife coatings using these comparative pigments is distinctly weaker. This is a result of the lower form factor of these pigments. The form factor is small since the longitudinal extent is low and the total thickness of the pigments is high. The thickness is about 800-1,000 nm, which leads to a form factor of less than 25.

The covering properties of the pigments of Examples 5 according to the invention (5-layer pigment) are even better than those of the 3-layer pigments Paliocrom® L 2800 or of Aloxal® 3010. The aluminum pigment used here for the oxidation had a mean starting thickness of only about 110 nm. The effective thickness of the oxidized and iron oxide-coated pigment is comparable to that of a conventional aluminum pigment such as, for example, Mex 2154, i.e. 300 to 400 nm.

The advantages of the effect pigments according to the invention therefore arise from the sum of various properties. The pigments according to the invention exhibit good covering power, good mechanical and chemical stability, and a high luster and only slight, shallow color flops. None of the comparative pigments, considered as a whole, has all of the properties mentioned to a satisfactory extent.

TABLE 3

Summary of the colorimetric properties and covering power parameters at $L^*_{110°, white}/L^*_{110°, black} = 0.9$

| | | Covering power | | Colorimetrics, coloristics | |
| | | Pigmentation | Area-related | | |
| Sample | Median value $d_{50}$ [μm] | level** [% by weight] | covering power D** [×10$^3$ cm$^{-2}$] | Luster 60°* | Subjective impression |
| --- | --- | --- | --- | --- | --- |
| <Ex. 1 | 22.0 | 10.5 | 5.9 | 23.3 | Full gold, flops to colorless with no substantial color flop |
| Ex. 2 | 19.7 | 10.5 | 6.1 | 19.3 | Copper-colored, flops to colorless with no substantial color flop |
| Ex. 4 | 26.2 | 11.5 | — | 18.3 | weak color flop from lemon-gold to reddish |
| Ex. 5 | 20.2 | 7.0 | 9.7 | 16.3 | Fine gold, slight color flop |
| Comp. Ex. 7 (Aloxal 3010) | 23.2 | 8.0 | 7.2 | 26.7 | Champagne colors, metallic, with no color flop |
| Comp. Ex. 8 (Variocrom M-red) | 14.6 | 10.5 | 3.6 | 11.2 | Very steep color flop from pink to gold |
| Comp. Ex. 9 (Variocrom M-gold) | 16.5 | 10.5 | 3.5 | 12.9 | Very steep color flop from greenish-gold to ocher yellow |
| Comp. Ex. 10 (Paliocrom L 2000) | 25.6 | 6.5 | 8.5 | 17.7 | Ocher yellow, metallic with no color flop |
| Comp. Ex. 11 (Paliocrom L 2800) | 20.9 | 10.5 | 6.3 | 16.2 | Orange, metallic with no color flop |

*at 10% pigmentation level
**with covering quotient 0.9

It is evident from Table 3 that Examples 1 and 2 of the invention behave in their covering power similarly to the Paliocrom® examples (Comparative Examples 10 and 11), but possess higher luster values. Example 4 of the invention possesses a lower covering power, but good luster values. The advantage of the effect pigments according to the invention lies in particular in their optical properties. They exhibit slight, shallow color flops, which are completely absent in the intensely colored Paliocrom® products. Of the effect pig- Properties of the Color Flop:

For comparison of the calorimetric properties, the wet lacquer applications described under "coverage comparison" were used. Of course, the applications of the non-shear-loaded samples were used. For FIG. 6, the measurements were carried out using a goniospectrophotometer supplied by Optronic Multiflash, Berlin and, for FIG. 7, a goniospectrophotometer Multi FX10 supplied by Datacolor with headquarters in D-45768 Marl, Germany.

Hitherto, conventional motor vehicle enamel systems have been measured at a constant incidence angle of 45° and at various measuring angles, for example at 15°, 20°, 25°, 45°, 70°, 75°, and 110°, relative to the specular angle. These measurements yield the luster or effect line, but register only a small part of the color range that modern interference pigments can assume. The light-dark flop of conventional metal pigments can be calorimetrically very well characterized by this method.

A principal feature of modern interference pigments, however, is the dependence of the color on the angle of incidence of the light. However, only a change in the incidence angle allows an adequate description of these pigments. Measurements taken at different incidence angles and a constant differential angle (e.g. 15°) relative to the respective specular angle lead in the a*b* system to the so-called interference line or interference anchor. This is a characteristic of every interference pigment. For further information reference is made to the article by W. R. Cramer and P. W. Gabel published in farbe+lack 109 (2003) 78. For an adequate assessment, the three incidence angles 25°, 45° and 75° and the differential angle showing a displacement of +/−15° in each case relative to the respective specular angle suffice. This means that at an incidence angle of 45° the associated specular angle is 135°. Two differential angles of +15° and −15° respectively are associated with this specular angle and thus the corresponding observation angles are 120° and 150°. The reference point here is in each case the horizontal and not the perpendicular of the sample.

In FIG. 6, the a* against b* values of all four pairs of angles (45°/110°; 45°/90°; 45°/60°; 45°/25°) with (incidence angle/measuring angle) from the L*a*b* system were plotted against each other, which represent the effect line. When considering the effect line, it is seen that in the case of all pigments a color shift to colorless (zero point) is to be discerned with increasing measuring angle, which is substantially more pronounced in the pigments according to the invention, especially in Example 1. In the examples according to the invention, a shift to the red range can be observed at very obtuse observation angles. This is discernible in FIG. 6 by characteristic "hooks" in the curves for Examples 1, 2 and 5 of the invention. Color location changes of this type were not obtained for the Paliocrom® products (Comparative Examples 10 and 11). The color location changes, however, for the two Variocrom® examples (Comparative Examples 8 and 9) are distinctly more pronounced.

Furthermore, for better representation of the color flop, under the designation "effect anchor" the a*,b* color values were plotted against each other additionally in FIG. 7 for the respective pairs of angles (25°/170°; 25°/140°; 45°/150°; 45°/120°; 75°/120°; 75°/90°) (incidence angle/measuring angle). Typically, the effect anchor in interfering pigments is almost horizontal on the respective effect line. The size of this effect anchor now represents a measure of the color flop.

In FIG. 7, it can now be seen that the Paliocrom® product (Comparative Example 11) forms no such anchor. On the contrary the effect anchor is a prolongation of the effect line. A color flop is thus virtually not present.

The pigments according to the invention under Examples 1, 2 and 4 are different. The effect anchor spreads here only to a moderate extent in the color space, which is why it is possible to speak here of a weak, shallow color flop.

However, the Variocrom® Example 9 exhibits by far the greatest changes in the color location at different observation angles. The effect anchor is strongly pronounced and cuts through the color space to a high extent, which is perceived by an independent observer as a steep color flop.

In the context of this invention, the color flop $\Delta H^*_{anchor}$ is understood as meaning the quantitative maximum difference of the individual $H^*_{anchor}$ values of the five anchor angles 25°/140°; 45°/150°; 45°/120°; 75°/120° and 75°/90°. The sixth value for 25°/170° was not considered in this quantitative observation, since it is not very highly reproducible. Measurement is carried out here at an observation angle of only 10° to the surface plane and at obtuse angles of this type the texture of the surface, which is dependent on the type of application, noticeably contributes to the measurement result.

The higher the $\Delta H^*_{anchor}$, the greater the shift in the color space and the color flop resulting therefrom. Here too, a clear graduation in the following sequence results: Paliocrom® (Comp. Ex. 11) and Aloxal® (Comp. Ex. 7) with almost no flop, the pigment according to the invention (Comp. Ex. 4) with an average flop and finally Variocrom® (Comp. Ex. 9) with by far the steepest flop.

In the following table, the corresponding values for the examples according to the invention and the comparative examples are reproduced.

TABLE 4

Colorimetric data for the characterization of the color flop

| Sample | Mininum $H^*_{anchor}$ | Maximum $H^*_{anchor}$ | $\Delta H^*_{anchor}$ | C* (45°/110°) |
|---|---|---|---|---|
| Example 1 | 75.62 | 80.51 | 4.89 | 63.4 |
| Example 2 | 63.03 | 70.25 | 7.22 | 59.1 |
| Example 4 | 60.36 | 88.01 | 27.65 | 46.1 |
| Comp. Example 7 (Aloxal 3010) | 81.72 | 83.84 | 2.12 | 16.2 |
| Comp. Ex. 9 (Variocrom M-gold) | 19.24 | 96.3 | 77.05 | 58.6 |
| Comp. Ex. 11 (Paliocrom L 2800) | 61.79 | 62.79 | 1.00 | 86.3 |

Safety Data:

As mentioned above, particularly aluminum pigments coated with iron oxide are not safe to use on account of the thermite reaction. In order to be able to characterize pulverulent substances with respect to their reactivity, various characteristic data are determined. The most important values are listed in Table 4 and described below.

Particle Size Distribution:

The reaction behavior of dusts is very strongly influenced by the particle size. The particle size distribution in the product is thus closely linked with the explosion technology data and must therefore always be included in the consideration of experimental results. Therefore the determination of the particle size distribution, e.g. by means of laser granulometry, must be considered first when carrying out any explosion technological investigation of dusts. To this end, the sample is dispersed in isopropanol for 300 s using ultrasound. After stirring for a short time with a magnetic stirrer, the sample is then measured by means of a laser granulometer. The $D_{50}$ value corresponds to the median value, and is usually used as a characteristic of the particle size distribution.

Minimum Ignition Energy:

The minimum ignition energy gives information about the ignitability of fluidized dust. The determination of the minimum ignition energy is carried out in a modified Hartmann apparatus. Under prescribed experimental conditions, the smallest electrical energy stored in a capacitor which is sufficient on discharge to ignite the ignitable mixture of an explosive dust/air mixture is determined.

Maximum Explosion Pressure ($p_{max}$):

Maximum pressure determined under prescribed experimental conditions which occurs in a closed container during the explosion of a dust mixed with air.

$K_{St}$ Value:

This is a dust-specific and test process-specific characteristic, which is calculated from the cubic law. It is numerically identical to the value for the maximum temporal pressure increase in a 1 m$^3$ container under the test conditions laid down in the guidelines VDI 3673, Sheet 1 and VDI 2263, Sheet 1, and in ISO 6184/1.

Lower Explosion Limit ($Ex_U$):

Lower limit of the concentration range in which a dust mixed with air can be made to explode.

Burnout Time:

Time which a powder packing of specific volume needs in order to burn out over a length of 10 cm after activation with a 1000° C. hot flame, where the period of activation must not exceed 5 min. The determination is carried out according to the handbook Prüfungen and Kriterien [Tests and Criteria] Part III, Section 33.2.1.4 issued by the Bundesanstalt für Materialforschung [German Federal Institute for Material Research].

Artificial, curved fingernails were coated with this nail varnish. Following drying of the solvent, a metallic effect with a weak color flop from lemon gold to reddish appeared.

The invention accordingly relates to the provision of colored effect pigments based on aluminum pigments oxidized under chemical wet-process conditions. These are coated under chemical wet-process conditions with a metal chalcogenide layer, preferably metal oxide layer, having a refractive index of >1.95. Between the porous aluminum oxide/hydroxide layer and the highly refractive metal chalcogenide layer, preferably metal oxide layer, there is formed a mixed layer, since the metal chalcogenide layer, preferably metal oxide layer, is able to penetrate at least partially into the pores of the aluminum oxide/hydroxide layer.

For this reason, the effect pigments according to the invention have a soft, shallow color flop. Depending on the layer thickness of the aluminum oxide/hydroxide and nature and layer thickness of the highly refractive metal chalcogenide, preferably metal oxide, a large number of colored effect pigments can be prepared.

The advantages of the effect pigments according to the invention reside, in addition to the shallow color flops, in their good covering power combined with high luster. The good covering power results from the fact that in the chemical

TABLE 5

Safety data

| Product | Cilas $D_{50}$ [μm] | Fe content [%] | Al content [%] | Burnout period [sec/10 cm] | Minimum ignition energy with no. ind. [mJ] | $Ex_u$ [g/m$^3$] | $K_{St}$ [barxm/s] | $p_{max}$ [bar] |
|---|---|---|---|---|---|---|---|---|
| Ex. 12 (Ferroxal 1) | 23.1 | 26.5 | 38.4 | does not burn | >1.000 | / | / | / |
| Ex. 13 (Ferroxal 2) | 23.7 | 19.9 | 31.0 | does not burn | >10.000 | / | / | / |
| Ex. 14 (VP 57424-G = MW 1291) | 21.1 | 12.2 | 45.4 | 10 | >258/<514 | 60 | 399 | 12.4 |
| Comp. Ex. 15 Al-Plv. E900 | 39 | <0.1 | 98.2 | does not burn | / | 30 | 400 | 12.5 |

The data indicated in Table 5 show that the pigments according to the invention comply with the same safety standard as the aluminum powder E900. That is to say, although the pigments according to the invention are aluminum pigments coated with iron oxide, they are not more hazardous than the aluminum powder used for comparison, which fulfills the customary commercial safety standards.

Example 16 According to the Invention

A nail varnish formulation having the following composition was also produced by mixing and stirring the starting components.

TABLE 6

Composition of nail varnish

| Substance | Concentration in % by weight |
|---|---|
| Nitrocellulose | 15 |
| Ethyl acetate | 21 |
| n-Butyl acetate | 36 |
| Isopropyl alcohol | 8 |
| Polyester binder | 9 |
| Dibutyl phthalate | 5 |
| Camphor | 2.0 |
| Stearalkonium bentonite | 1.0 |
| Pigments of Example 4 according to the invention | 3.0 | wet-process oxidation of the aluminum pigments the oxide layer grows partly into the aluminum core. Since aluminum pigments with thicknesses of from about 100 to 300 nm are too thick per se for optically opaque characteristics, by choice of suitably thick aluminum pigments the aluminum core thickness finally remaining in the colored effect pigment can be optimized to a thickness of preferably from 30 nm to 80 nm and thus the total thickness of the effect pigment can be minimized. By this means, the form factor of the pigments is maximized, which leads to good orientation in the application medium and thus to a good degree of luster.

The aluminum oxide/hydroxide layer produced by chemical wet-process oxidation furthermore acts as a sealing layer between the aluminum core and the highly refractive metal chalcogenide layer, preferably metal oxide layer. Thus, particularly when use is made of iron oxide as a highly refractive metal oxide layer, an aluminothermic reaction can be effectively suppressed. Consequently, the effect pigments according to the invention are safe to use and manufacture even though they have high iron contents.

What is claimed is:

1. Effect pigments having an aluminum core or aluminum alloy core and an aluminum oxide-containing or aluminum oxide/hydroxide-containing layer enveloping said aluminum core or aluminum alloy core, obtained by chemical wet-process oxidation of lamellar aluminum pigments or aluminum alloy pigments, the content of metallic aluminum in the aluminum core or aluminum alloy core being not more than 90% by weight, based on the total weight of the pigment, characterized in that the oxidized aluminum pigments or aluminum alloy pigments exhibit at least one highly refractive metal chalcogenide layer having a refractive index of >1.95, said at least one metal chalcogenide layer being a layer of an intrinsically colored metal chalcogenide, and a mixed layer is formed between the highly refractive metal chalcogenide layer and the enveloping aluminum oxide-containing or aluminum oxide/hydroxide-containing layer, wherein the aluminum oxide-containing or aluminum oxide/hydroxide containing enveloping layer has a thickness of from 50-300 nm, and wherein the effect pigments have a weak color flop having a $\Delta H^*_{anchor}$ in a range of between 1.5 and 50, and wherein the refractive index of the mixed layer between the aluminum oxide-containing or aluminum oxide/hydroxide-containing layer and the highly refractive metal chalcogenide layer exhibits a gradient perpendicularly to the pigment surface extending from the refractive index of the pure aluminum oxide/hydroxide-containing layer and the refractive index of the highly refractive metal chalcogenide layer.

2. The effect pigments according to claim 1, characterized in that the aluminum oxide-containing or aluminum oxide/hydroxide-containing layer and the highly refractive metal chalcogenide layer having a refractive index of >1.95 penetrate each other at least partially.

3. The effect pigment according to claim 1, characterized in that the thickness of the mixed layer between the aluminum oxide-containing or aluminum oxide/hydroxide-containing layer and the highly refractive metal chalcogenide layer having a refractive index of >1.95 is at least 10 nm.

4. The effect pigments according to claim 1, characterized in that between the aluminum oxide-containing or aluminum oxide/hydroxide-containing layer and the highly refractive metal chalcogenide layer there is disposed at least one oxide layer of a material having a refractive index of <1.8.

5. The effect pigments according to claim 4, characterized in that the aluminum oxide-containing or aluminum oxide/hydroxide-containing layer and the oxide layer of a material having a refractive index of <1.8 penetrate each other at least partially.

6. The effect pigments according to claim 4, characterized in that the aluminum oxide-containing or aluminum oxide/hydroxide-containing layer and the oxide layer of a material having a refractive index of <1.8 together form a mixed layer having a thickness of preferably at least 10 nm.

7. The effect pigments according to claim 4, characterized in that the aluminum oxide-containing or aluminum oxide/hydroxide-containing layer, the oxide layer of a material having a refractive index of <1.8 and the highly refractive metal chalcogenide layer having a refractive index of >1.95 together form a common mixed layer preferably having a thickness of at least 10 nm.

8. The effect pigments according to claim 4, characterized in that the refractive index of the mixed layer between the pure aluminum oxide-containing or aluminum oxide/hydroxide-containing layer, the oxide layer of a material having a refractive index of <1.8 and the highly refractive metal chalcogenide layer shows a gradient perpendicularly to the pigment surface, which gradient extends from the refractive index of the aluminum oxide/hydroxide-containing layer to that of the pure highly refractive metal chalcogenide layer.

9. The effect pigments according to claim 4, characterized in that the oxide layer of a material having a refractive index of <1.8 is a silicon dioxide-containing layer.

10. The effect pigments according to claim 1, characterized in that the aluminum core exhibits an average layer thickness of less than 250 nm.

11. The effect pigments according to claim 1, characterized in that the aluminum core exhibits an average layer thickness of less than 150 nm.

12. The effect pigments according to claim 1, characterized in that the at least one metal chalcogenide layer or a plurality of metal chalcogenide layers having a refractive index of >1.95 comprises colored metal chalcogenide layers and metal chalcogenide layers with substantially no intrinsic coloration and are arranged in a predominantly alternating configuration.

13. The effect pigments according to claim 1, characterized in that the iron oxide is present in the modification hematite, goethite, magnetite or mixtures thereof.

14. The effect pigments according to claim 1, characterized in that the sole metal chalcogenide layer or the plurality of metal chalcogenide layers with substantially no intrinsic coloration are selected from the group consisting of titanium oxide, zirconium oxide, zinc oxide, tin oxide, cerium oxide and hydrated oxides thereof and also mixtures thereof.

15. The effect pigments according to claim 4, characterized in that there is applied to the aluminum oxide-containing or aluminum oxide/hydroxide-containing layer a silicon dioxide layer followed by an iron oxide layer.

16. The effect pigments according to claim 1, characterized in that there is applied to the at least one metal chalcogenide layer having a refractive index of >1.95 at least one oxide layer having a refractive index of <1.8.

17. The effect pigments according to claim 16, characterized in that the at least one oxide layer having a refractive index of <1.8 is selected from the group consisting of silicon dioxide, aluminum oxide and/or aluminum hydroxide, boron oxide, and mixtures thereof.

18. The effect pigments according to claim 1, characterized in that they possess a form factor of more than 20 and preferably more than 25.

19. The effect pigments according to claim 1, characterized in that they possess a form factor of more than 40.

20. The effect pigments according to claim 1, characterized in that the aluminum pigments or aluminum alloy pigments are surface-modified with organic groups or organic compounds.

21. The effect pigments according to claim 1, characterized in that the aluminum pigments or aluminum alloy pigments have a colored appearance showing a soft color flop.

22. The effect pigments according to claim 1, characterized in that the metal chalcogenides are metal oxides, metal sulphides, metal selenides, metal tellurides, or mixtures thereof.

23. The effect pigments according to claim 1, characterized in that the aluminum alloy contains at least 5% by weight, based on the metal content of the pigment, of one or more of aluminum and various metals, preferably iron, manganese, copper, vanadium, chromium, nickel, cobalt, silicon, magnesium, zinc, and/or titanium.

24. A process for the production of effect pigments according to claim 1, characterized by
  (a) oxidizing aluminum pigments or aluminum alloy pigments which are suspended in a liquid phase containing organic solvent, using an oxidizing agent,
  (b) applying at least one metal chalcogenide layer having a refractive index of >1.95 onto the pigments oxidized in step (a), during which process a mixed layer forms between the metal chalcogenide layer and the aluminum oxide/hydroxide layer.

25. The process according to claim 24, characterized in that an oxide layer having a refractive index of <1.8 is applied prior to the application of the at least one highly refractive metal chalcogenide layer having a refractive index of >1.95 in step (b).

26. The process according to claim 24, characterized in that the oxidizing agent in step (a) is water and the organic solvent is water-miscible.

27. The process according to claim 26, characterized in that the amount of water based on the aluminum pigments or aluminum alloy pigments is from 10 to 120% by weight.

28. The process according to claim 27, characterized in that the amount of water based on the aluminum pigments or the aluminum alloy pigments is from 15 to 55% by weight.

29. The process according to claim 24, characterized in that a catalyst is added in step (a).

30. The process according to claim 24, characterized in that in step (b) the application of the metal chalcogenide layer is carried out by the addition of metal salt dissolved in substantially organic solvent to a dispersion of aluminum pigments or aluminum alloy pigments oxidized in step (a).

31. The process according to claim 24, characterized in that the organic solvent is selected from the group consisting of alcohols, glycols and ketones and preferably ethanol, n-propanol, isopropanol, n-butanol, isobutanol, tert-butanol, methoxypropanol, acetone, butyl glycol, and mixtures thereof.

32. The process according to claim 24, characterized in that the oxidation in step (a) is carried out at a temperature between room temperature and the boiling point of the mixture of water and organic solvent.

33. The process according to claim 24, characterized in that in step (a) the suspension exhibits a pH between pH 7 and pH 12.

34. A coating composition, characterized in that it contains effect pigments according to claim 1.

35. The coating composition according to claim 34, characterized in that it is selected from the group consisting of coatings, varnishes, motor vehicle enamels, printing inks, writing inks, plastics materials, glass, ceramics, or cosmetic preparations.

36. The coating composition according to claim 34, characterized in that the cosmetic preparation is a nail varnish.

37. A method for preparing a composition of matter selected from the group consisting of a coating, a varnish, a motor-vehicle enamel, a powder-based varnish, a printing ink, a writing ink, a plastic, a glass, a ceramic and a cosmetic preparation, which method comprises incorporating within said composition of matter an amount of at least one effect pigment according to claim 1.

38. The method according to claim 37, wherein the composition of matter is a cosmetic preparation and wherein the cosmetic preparation is selected from the group consisting of nail varnish, lipstick, make-up, hair treatment preparations, skin care preparations, mascara, eye-shadow, eyeliner, rouge, perfume, eau de toilette, powders in bulk or compressed form and tattooing formulations.

* * * * *

UNITED STATES PATENT AND TRADEMARK OFFICE
CERTIFICATE OF CORRECTION

PATENT NO. : 7,828,890 B2
APPLICATION NO. : 10/580120
DATED : November 9, 2010
INVENTOR(S) : Frank Henglein, Hermann Birner and Michael Grüner Page 1 of 1

It is certified that error appears in the above-identified patent and that said Letters Patent is hereby corrected as shown below:

On the title page item (54) and Col. 1, line 1, should read:
(54) EFFECT PIGMENTS HAVING AN ALUMINUM OR ALUMINUM ALLOY CORE, PROCESS FOR THE PRODUCTION THEREOF AND USE THEREOF On the title page item (73) should read:
(73) Assignee: Eckart GmbH (DE)

Signed and Sealed this
Fifth Day of July, 2011

David J. Kappos
*Director of the United States Patent and Trademark Office*